US008193663B2

(12) United States Patent
Sato

(10) Patent No.: US 8,193,663 B2
(45) Date of Patent: Jun. 5, 2012

(54) INFORMATION PROCESSING APPARATUS WITH MULTIPLE POWER RECEIVING UNITS

(75) Inventor: Kenji Sato, Tokyo (JP)

(73) Assignee: Oki Data Corporation, Tokyo (JP)

( * ) Notice: Subject to any disclaimer, the term of this patent is extended or adjusted under 35 U.S.C. 154(b) by 194 days.

(21) Appl. No.: 12/236,944

(22) Filed: Sep. 24, 2008

(65) Prior Publication Data
US 2009/0082910 A1    Mar. 26, 2009

(30) Foreign Application Priority Data

Sep. 26, 2007   (JP) ................................. 2007-248426

(51) Int. Cl.
*H02J 1/00* (2006.01)
*H02J 3/00* (2006.01)
(52) U.S. Cl. ............................... 307/87; 307/65; 307/80
(58) Field of Classification Search ...................... 307/86
See application file for complete search history.

(56) References Cited

U.S. PATENT DOCUMENTS

| 4,628,433 | A  | * | 12/1986 | Notohamiprodjo | 363/65 |
|---|---|---|---|---|---|
| 5,654,593 | A  | * | 8/1997 | Murata | 307/86 |
| 6,201,675 | B1 | * | 3/2001 | Ballinger | 361/63 |
| 6,271,605 | B1 | * | 8/2001 | Carkner et al. | 307/125 |
| 6,614,133 | B2 | * | 9/2003 | Belson et al. | 307/58 |
| 6,630,752 | B2 | * | 10/2003 | Fleming et al. | 307/64 |
| 7,364,082 | B2 | * | 4/2008 | Harel et al. | 235/462.15 |
| 2003/0167347 | A1 | * | 9/2003 | Combs et al. | 709/250 |
| 2004/0169422 | A1 | * | 9/2004 | Eaton et al. | 307/64 |
| 2005/0108584 | A1 | * | 5/2005 | Kawakami et al. | 713/300 |
| 2007/0121832 | A1 | * | 5/2007 | Ghoshal | 379/93.36 |
| 2007/0124606 | A1 | * | 5/2007 | Hsieh | 713/300 |
| 2007/0189495 | A1 | * | 8/2007 | Crawley et al. | 379/323 |
| 2007/0273216 | A1 | * | 11/2007 | Farbarik | 307/86 |
| 2008/0111424 | A1 | * | 5/2008 | Yeh | 307/65 |

FOREIGN PATENT DOCUMENTS

JP   2001-211274 A   8/2001

OTHER PUBLICATIONS

JP Pg-pub 2007-148781 to Obara—english translation, Jun. 14, 2007.*

* cited by examiner

*Primary Examiner* — Rexford N. Barnie
*Assistant Examiner* — Justen Fauth
(74) *Attorney, Agent, or Firm* — Panitch Schwarze Belisario & Nadel LLP

(57) ABSTRACT

An information processing apparatus is provided that has a processor for performing an information processing, a power supply unit for receiving an external electric power from an external electric power source and for supplying the external electric power to the processor, a first power receiving unit connected to a first communication medium, the first power receiving unit receiving a first electric power from the first communication medium and supplying the first electric power to the processor, a second power receiving unit connected to a second communication medium, the second power receiving unit receiving a second electric power from the second communication medium and supplying the second electric power to the processor, an electric power detection unit for detecting the first electric power or the second electric power, and a switching unit for supplying one of the external electric power, the first electric power, and the second electric power to the processor according to a result of detection made by the electric power detection unit.

9 Claims, 26 Drawing Sheets

| LAN INCOMING ELECTRICITY DETECTION CIRCUIT LANPowerOn | USB INCOMING ELECTRICITY DETECTION CIRCUIT USBPowerOn | SWITCH OUTPUT |
|---|---|---|
| OFF | OFF | Main5V(Main5V ON1=ON) |
| OFF | ON | USB5V(USB5V ON1,2=ON) |
| ON | OFF | LAN5V(LAN5V ON1,2=ON) |
| ON | ON | LAN5V(LAN5V ON1,2=ON) |

FIG. 6

| FIVE VOLT SWITCHING CIRCUIT LAN5V ON2 | LAN INCOMING ELECTRICITY DETECTION CIRCUIT LANPowerLow (ON:Low DETECTION) | FIVE VOLT SWITCHING CIRCUIT LAN5V ON2 | USB INCOMING ELECTRICITY DETECTION CIRCUIT USBPowerLow (ON:Low DETECTION) | CONTROLLER POWER SUPPLY MainPowerON | NOTE |
|---|---|---|---|---|---|
| OFF | OFF | OFF | OFF | ON | |
| OFF | OFF | OFF | ON | ON | |
| OFF | OFF | ON | OFF | OFF | |
| OFF | OFF | ON | ON | ON | |
| OFF | ON | OFF | OFF | ON | |
| OFF | ON | OFF | ON | ON | |
| OFF | ON | ON | OFF | OFF | |
| OFF | ON | ON | ON | ON | |
| ON | OFF | OFF | OFF | OFF | |
| ON | OFF | OFF | ON | OFF | |
| ON | OFF | ON | OFF | OFF | THIS COBINATION DOES NOT OCCUR |
| ON | OFF | ON | ON | OFF | |
| ON | ON | OFF | OFF | ON | |
| ON | ON | OFF | ON | ON | |
| ON | ON | ON | OFF | OFF | THIS COBINATION DOES NOT OCCUR |
| ON | ON | ON | ON | ON | |

FIG. 9

| LAN INCOMING ELECTRICITY DETECTION CIRCUIT LANPowerOn | USB INCOMING ELECTRICITY DETECTION CIRCUIT USBPowerOK | SWITCH OUTPUT |
|---|---|---|
| OFF | OFF | Main5V(Main5V ON1=ON) |
| OFF | ON | USB5V(USB5V ON1,2=ON) |
| ON | OFF | LAN5V(LAN5V ON1,2=ON) |
| ON | ON | LAN5V(LAN5V ON1,2=ON) |

FIG. 17

INFORMATION PROCESSING APPARATUS WITH MULTIPLE POWER RECEIVING UNITS

BACKGROUND OF THE INVENTION

1. Field of the Invention

The present invention relates to an information processing apparatus capable of receiving an electric power from a communication medium carrying data.

2. Description of Related Art

Japanese Patent Application Publication No. 2001-211274 discloses an image forming apparatus that can operate with minimum operational units with an electric power supplied from a USB (Universal Serial Bus) cable connected to a host, a hub, and the like while the USB cable is connected to the image forming apparatus.

The image forming apparatus as disclosed in Japanese Patent Application Publication No. 2001-211274 has multiple operating modes for different power consumption amounts. When the USB cable is initially connected to the image forming apparatus, the image forming apparatus operates with the minimum operational units with an electric current of up to 100 mA supplied from the USB cable. When the initialization of the USB connection finishes, the image forming apparatus changes the operating mode so that the image forming apparatus operates with an electric current of up to 500 mA. When the image forming apparatus performs a processing such as printing operation and needs an electric current more than what the USB cable can provide, the image forming apparatus turns on a main power supply.

SUMMARY OF THE INVENTION

However, the conventional image forming apparatus as described above can receive the electric power from only a specific interface. That is, when a supply of the electric power from that interface becomes unstable, the image forming apparatus has no other choice but to turn on the main power supply to maintain a standby state.

This invention is made in consideration of the above circumstances, and it is the object of the present invention to provide an image forming apparatus that can receive an electric power from multiple sources and can switch the source of the electric power according to the incoming electric power from each of the sources.

To solve the above problem, the information processing apparatus of this invention has a processor for performing an information processing, a power supply unit for receiving an external electric power from an external electric power source and for supplying the external electric power to the processor, a first power receiving unit connected to a first communication medium, the first power receiving unit receiving a first electric power from the first communication medium and supplying the first electric power to the processor, a second power receiving unit connected to a second communication medium, the second power receiving unit receiving a second electric power from the second communication medium and supplying the second electric power to the processor, an electric power detection unit for detecting the first electric power or the second electric power, and a switching unit for supplying one of the external electric power, the first electric power, and the second electric power to the processor according to a result of detection made by the electric power detection unit.

The information processing apparatus of this invention can be connected to multiple communication media capable of supplying the electric power, and has the electric power detection unit for detecting a value of the electric power supplied by the communication medium. The information processing apparatus can choose one of the communication media or the power supply unit as the source of the electric power based on a value of the electric power detected by the electric power detection unit, and supplies the chosen electric power to the processor.

The image forming apparatus according to this invention can receive the electric power from multiple communication media carrying data, and can switch the source of the electric power according to the incoming electric power from each of the communication media. Thus, even where the supply of the electric power from one of the multiple communication media becomes unstable, the image forming apparatus can receive the electric power from another communication medium. That is, the image forming apparatus does not necessarily have a power supply unit within the image forming apparatus, and can greatly reduce power consumption in the standby state.

DETAILED DESCRIPTION OF THE DRAWINGS

This invention may take physical form in certain parts and arrangements of parts, a preferred embodiment and method of which will be described in detail in this specification and illustrated in the accompanying drawings which form a part hereof, and wherein:

FIG. 6 is a figure describing a switching logic of a logic IC 205 constituting the five volt switching circuit;

FIG. 9 is a figure describing a switching logic of a logic IC 220 constituting the main power supply switching circuit;

FIG. 17 is a figure describing a switching logic of a logic IC 380 constituting the five volt switching circuit;

Figure 23:
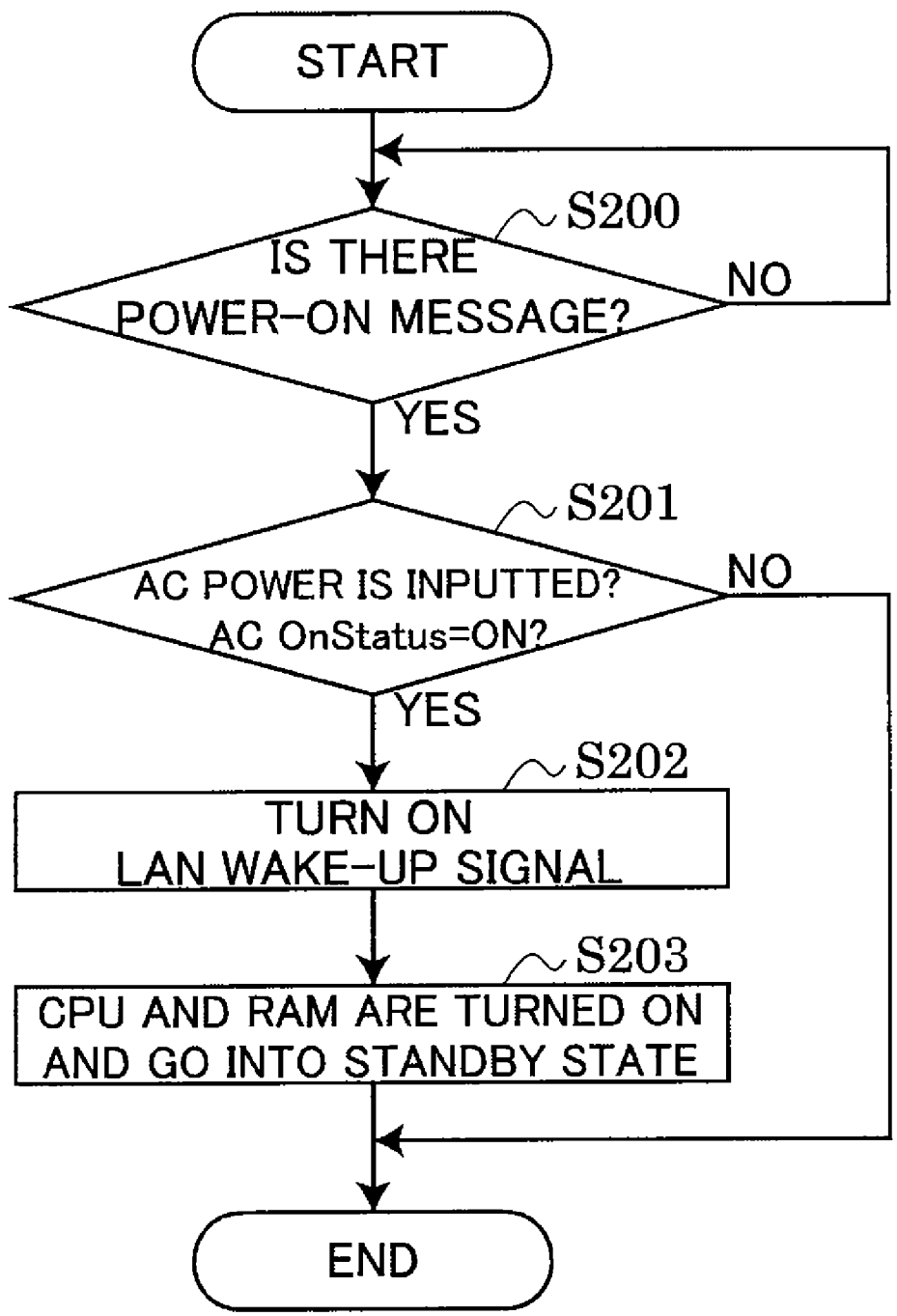
Figure 24:
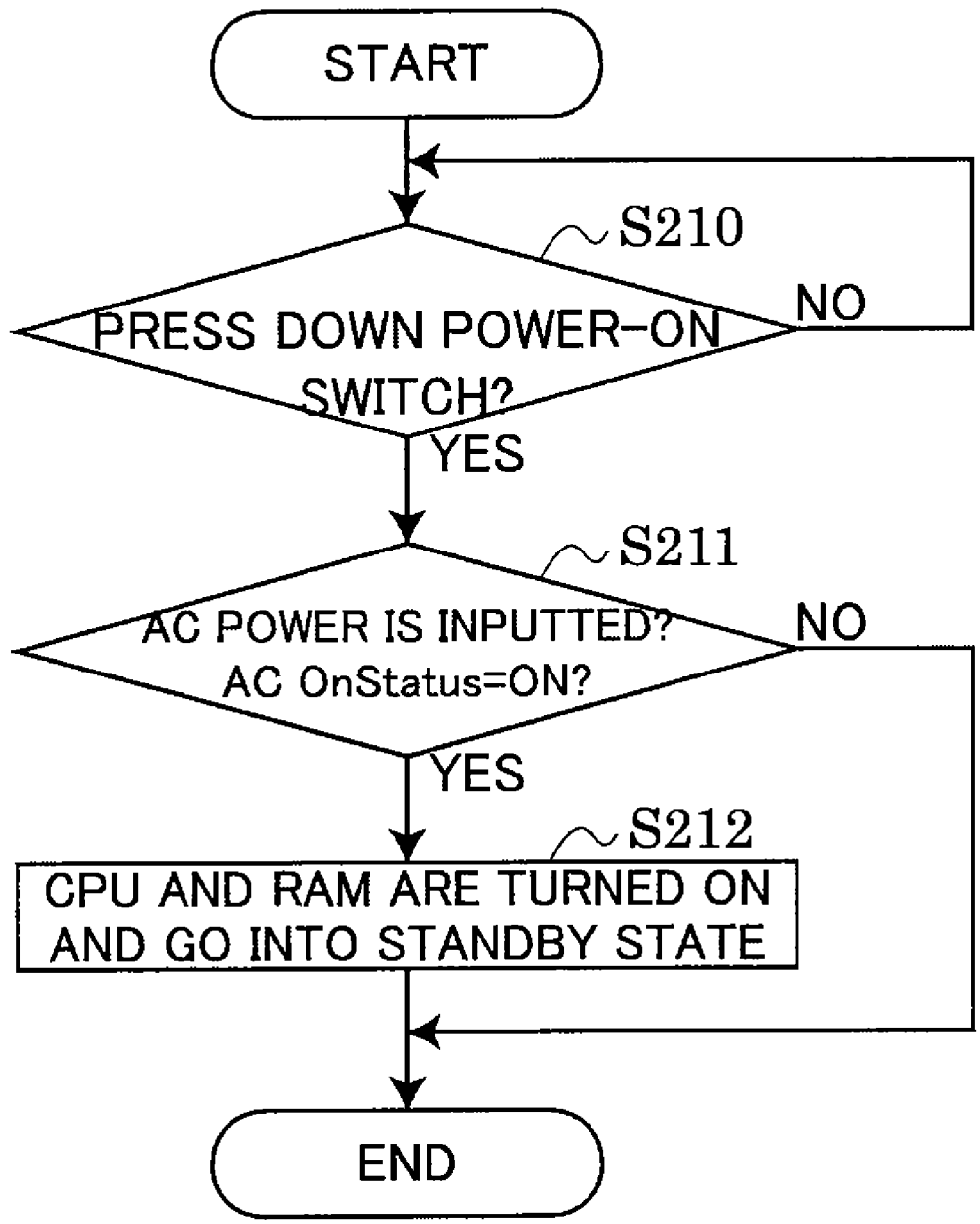
Figure 25:
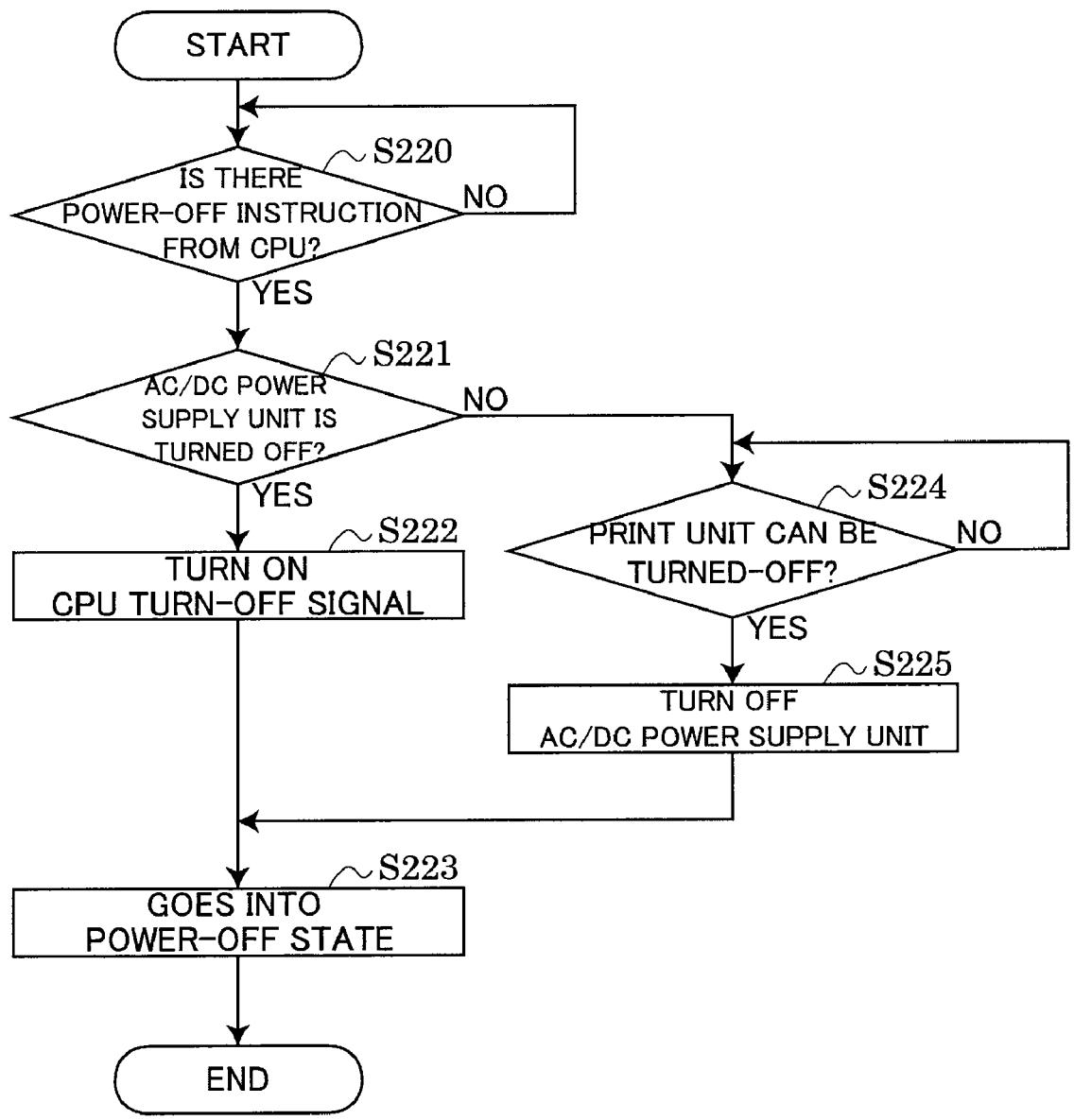
Figure 26:
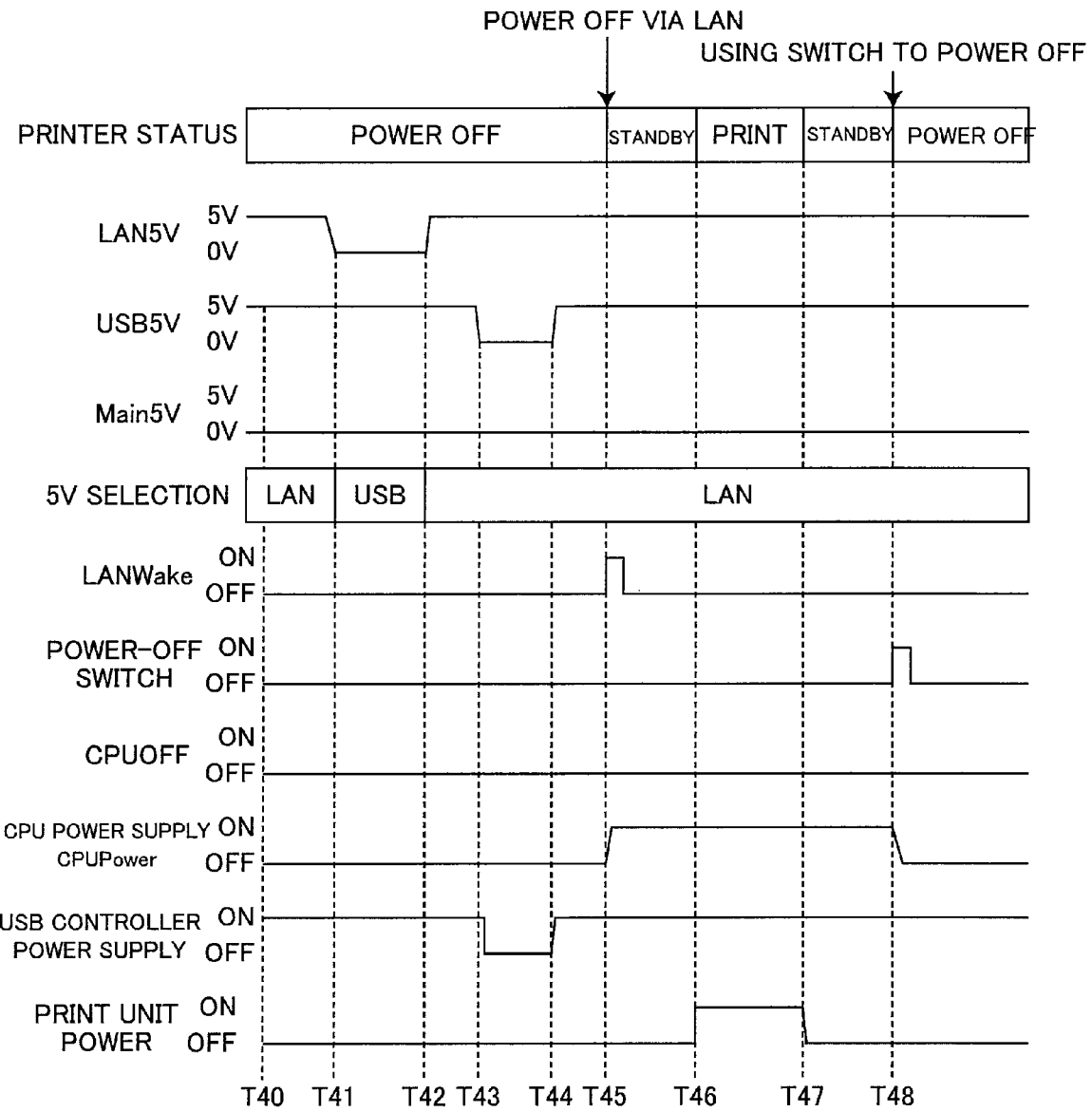

FIG. 23 is a flowchart describing the steps from when the printer 401 receives the power turn-on message instructing the printer 401 to turn on the power to when the printer 401 turns on the power;

FIG. 24 is a flowchart describing a processing to turn on the printer 401 by pressing down a power-on switch 440;

FIG. 25 is a flowchart describing a processing to stop the power of the printer 401; and FIG. 26 is a time chart describing an example of operation of the printer 401.

PREFERRED EMBODIMENTS

First Embodiment

Figure 1:
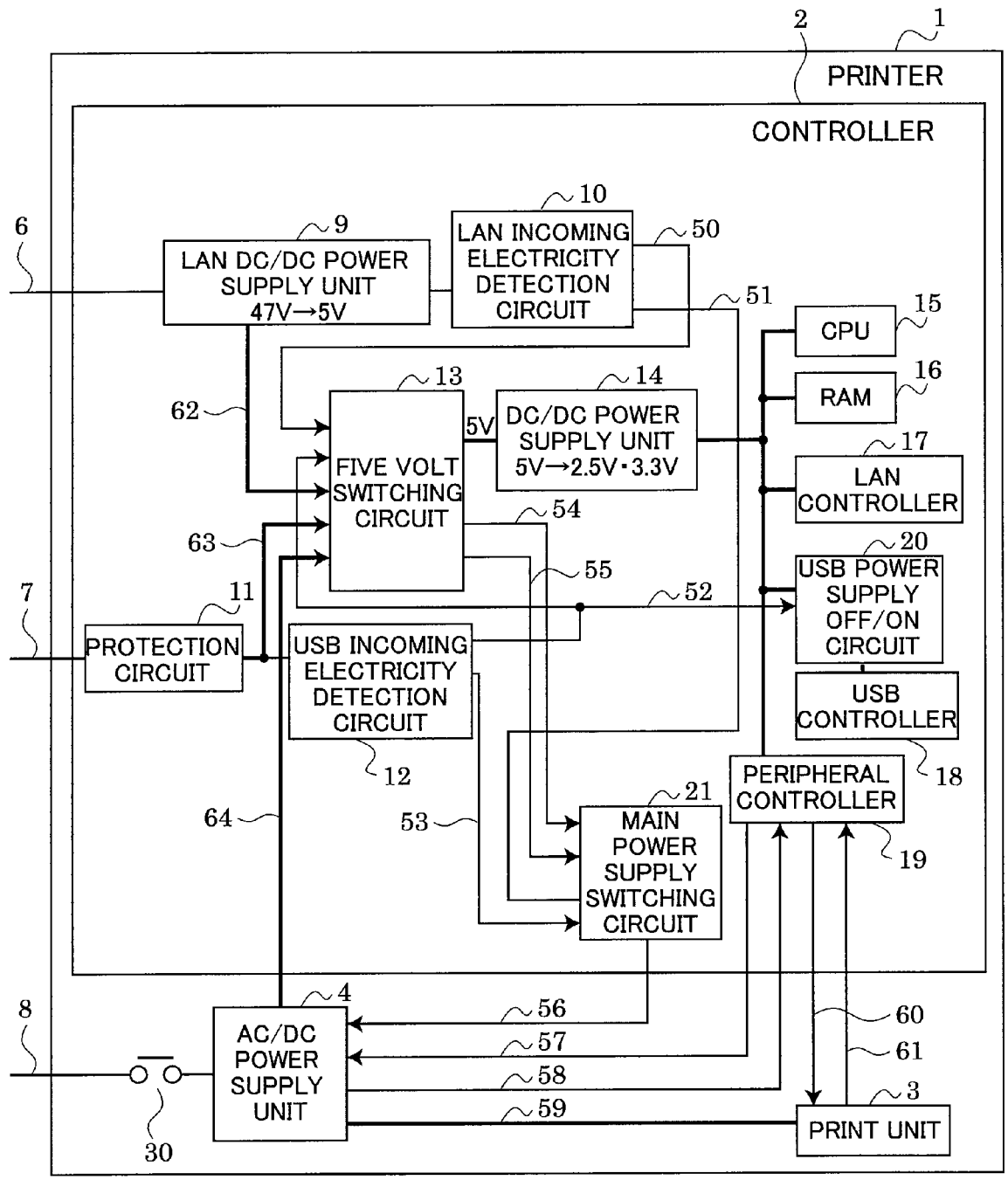
FIG. 1 is a figure describing an essential portion of a printer 1 according to the first embodiment of this invention.

FIG. 1 is a block diagram describing an essential portion of a printer 1 as an example of an information processing apparatus according to this embodiment. The printer 1 has a controller 2, a print unit 3, an AC/DC (Alternating Current/Direct Current) power supply unit 4 serving as a power supply unit, an AC cable 8, and a power supply switch 30. The controller 2 has a LAN (Local Area Network) cable 6 serving as a communication medium, a USB cable 7, a LAN DC/DC power supply unit 9, a LAN incoming electricity detection circuit 10 serving as an electric power detection unit, a protection circuit 11, a USB incoming electricity detection circuit 12 serving as the electric power detection unit, a five volt switching circuit 13 serving as a switching unit, a DC/DC power supply unit 14, a CPU (Central Processing Unit) 15 serving as a processor, a RAM (Random Access Memory) 16, a LAN controller 17, a USB controller 18, a peripheral controller 19, a USB power supply OFF/ON circuit 20, and a main power supply switching circuit 21.

After the controller 2 receives print data from the LAN cable 6 and the USB cable 7, the controller 2 performs image processing, and provides a print instruction to the print unit 3. The print unit 3 forms an image on a recording medium such as paper upon receiving the print instruction from the controller 2.

The AC/DC power supply unit 4 converts an alternating current received from the AC cable 8 into a direct current. Upon receiving an instruction from the controller 2, the AC/DC power supply unit 4 provides an electric power to the controller 2 via a main five volt wiring 64. The AC/DC power supply unit 4 is connected to the print unit 3 via a print power wiring 59. The AC/DC power supply unit 4 provides an electric power to the print unit 3 via the print power wiring 59.

The LAN cable 6 is used to connect to a host machine such as a personal computer, a router, a switching hub, and the like. It depends on LAN infrastructure whether or not the electricity can be supplied via the LAN cable. The USB cable 7 is used to connect to a host, a USB hub, and the like. The electric power of up to 0.5 W to 2.5 W (5V, 100 mA to 500 mA) can be supplied from the host or the USB hub to the printer 1. The USB cable 7 is connected to the protection circuit 11. The electric power outputted from the protection circuit 11 is supplied to the five volt switching circuit 13 via a USB five volt wiring 63.

The AC cable 8 is a power line for providing the electricity from an external power source such as a wall outlet to the printer 1.

The LAN DC/DC power supply unit 9 converts a 47 volt direct current supplied from the LAN cable 6 into a 5V current. The converted electric power is supplied to the five volt switching circuit 13 via a LAN five volt wiring 62. The LAN DC/DC power supply unit 9 is connected to the LAN incoming electricity detection circuit 10 via a predetermined data cable.

Figure 2:
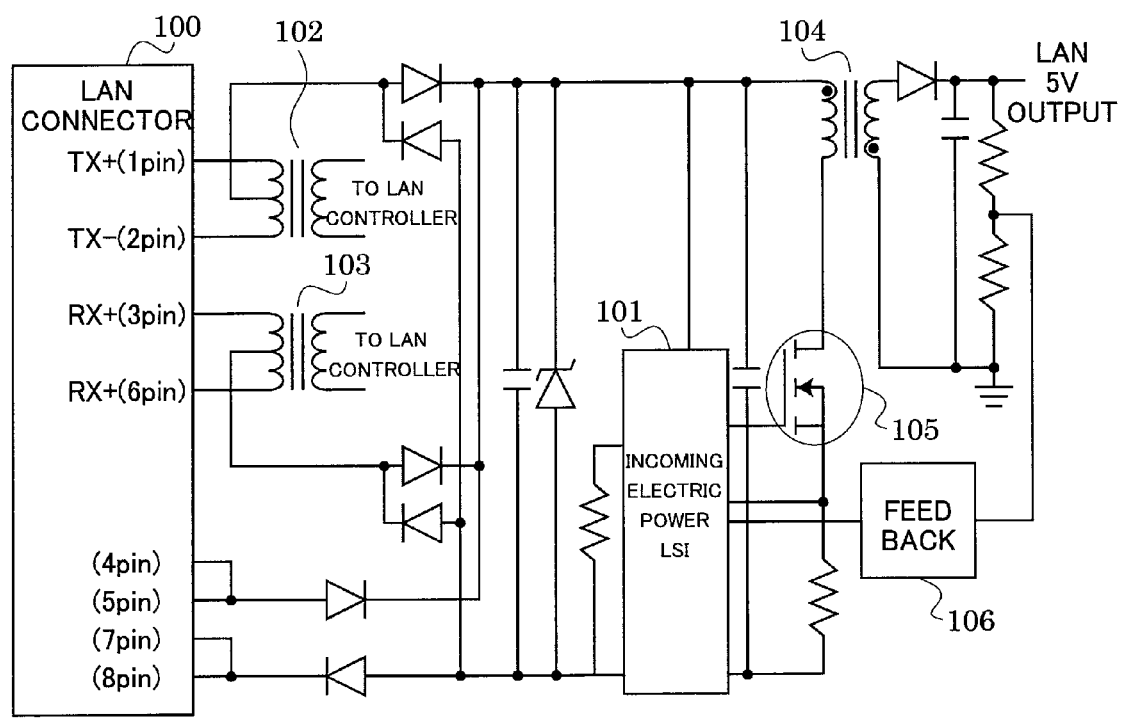
FIG. 2 is a figure describing a LAN DC/DC power supply unit according to the first embodiment.

FIG. 2 is a diagram describing the LAN DC/DC power supply unit 9. The LAN DC/DC power supply unit 9 has a LAN connector 100, an incoming electric power LSI (Large Scale Integration) 101, transformers 102, 103, and 104, FET (Field Effect Transistor) 105, and a feedback circuit 106.

The LAN connector 100 is a connector to which the LAN cable 6 is connected to. In the LAN cable, the electric power may be transferred via data lines carrying data, or alternatively may be transferred via spare lines not carrying data. The circuit configuration of this embodiment can be applicable to both of the data lines and the spare lines. The incoming electric power LSI 101 controls operations of detection and classification, which are operations to be performed by a device receiving the electric power according to the standard IEEE802.3af. The incoming electric power LSI 101 uses a signal from the feedback circuit 106 while receiving the electric power to control the FET 105, and supplies the electricity to the five volt switching circuit 13 via the LAN five volt wiring 62. The transformers 102 and 103 not only convert the level of received signals for the LAN controller 17 but also retrieve an electric current from the lines in the LAN cable 6 if the electric power is supplied from the LAN cable 6. The transformer 104 converts the voltage of the electric power supplied from the LAN cable 6 into 5V according to ON/OFF of the FET 105 controlled by the incoming electric power LSI 101. The FET 105 is a field-effect transistor controlled by the incoming electric power LSI 101. The feedback circuit 106 is a return circuit to stabilize the output voltage of 5V.

The LAN incoming electricity detection circuit 10 monitors an incoming electricity from the LAN cable 6. The LAN incoming electricity detection circuit 10 is connected to the five volt switching circuit 13 via a LAN power-on data cable 50. While the electric power supplied from the LAN cable 6 is within an operable range of the DC/DC power supply unit 14, the LAN incoming electricity detection circuit 10 outputs a LAN power-on signal to the five volt switching circuit 13 to indicate that the LAN cable 6 is providing the electric power. The LAN incoming electricity detection circuit 10 is connected to the main power supply switching circuit 21 via a Low LAN power data wiring 51. The LAN incoming electricity detection circuit 10 outputs a low LAN power signal to the main power supply switching circuit 21 in a case where the electric power supplied from the LAN cable 6 drops within the operable range of the DC/DC power supply unit 14.

Figure 3:
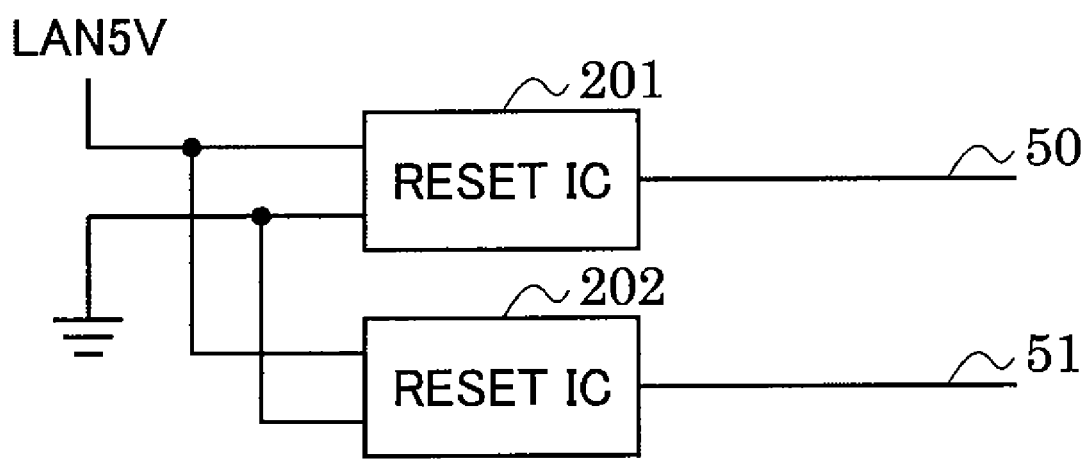
FIG. 3 is a figure describing the circuit configuration of a LAN incoming electricity detection circuit according to the first embodiment.

FIG. 3 is a figure describing the circuit configuration of the LAN incoming electricity detection circuit 10. The LAN incoming electricity detection circuit 10 has a reset IC (Integrated Circuit) 201 and a reset IC 202. The reset IC 201 outputs the LAN power-on signal in a case where the electric power supplied from the LAN cable 6 is within the operable range of the DC/DC power supply unit 14. In this embodiment, it is assumed that the minimum operation voltage of the DC/DC power unit 14 is 4.5 volt, and the reset IC 201 outputs the LAN power-on signal in a case where the voltage of the electric power supplied from the LAN cable 6 becomes 4.6V or more. In a case where the voltage of the electric power supplied from the LAN cable 6 drops to 4.75 volt or less, the reset IC 201 stops the output of the LAN power-on signal, and the reset IC 202 outputs the low LAN power signal.

The protection circuit 11 protects the printer 1 from the electric power supplied from the USB cable 7. The protection circuit 11 is connected to the five volt switching circuit 13 through the USB five volt wiring 63. The voltage supplied from the host, the hub, or the like is usually 5 volt. In a case where an abnormal voltage is supplied from the host, the hub, or the like to the printer 1, the protection circuit 11 short-circuit the abnormal electric power to the ground via a varistor.

The USB incoming electricity detection circuit 12 monitors the incoming electricity from the USB cable 7. The USB incoming electricity detection circuit 12 is connected to the five volt switching circuit 13 and to the USB power supply OFF/ON circuit 20 via the USB power-on data cable 52. In a case where the electric power supplied from the USB cable 7 is within the operable range of the DC/DC power supply unit 14, the USB incoming electricity detection circuit 12 outputs a USB power-on signal to the five volt switching circuit 13 and the USB power supply OFF/ON circuit 20 to indicate that the USB cable 7 is providing the electric power. The USB incoming electricity detection circuit 12 is connected to the main power supply switching circuit 21 via a USB power-low data wiring 53. In a case where the electric power supplied from the USB cable 7 drops within the operable range of the DC/DC power supply unit 14, the USB incoming electricity detection circuit 12 outputs a low USB power signal to the main power supply switching circuit 21.

Figure 4:
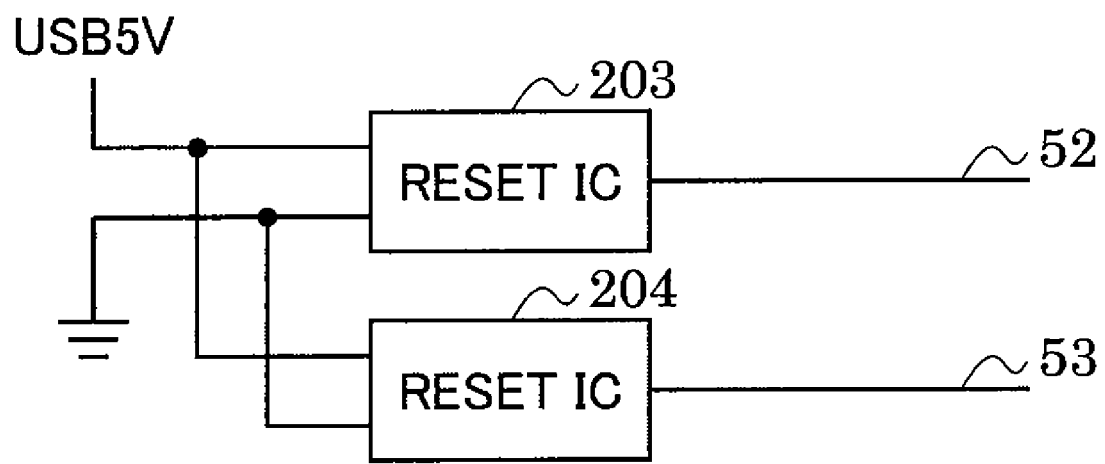
FIG. 4 is a figure describing the circuit configuration of a USB incoming electricity detection circuit according to the first embodiment.

FIG. 4 is a figure describing the circuit configuration of the USB incoming electricity detection circuit 12. The USB incoming electricity detection circuit 12 has a reset IC 203 and a reset IC 204. The reset IC 203 outputs the USB power-on signal in a case where the electric power supplied from the USB cable 7 is within the operable range of the DC/DC power supply unit 14. In this embodiment, it is assumed that the minimum operable voltage of the DC/DC power supply unit 14 is 4.5 volt, and the reset IC 203 outputs the USB power-on signal in a case where the voltage of the electric power supplied from the USB cable 7 becomes 4.6 volt or more. In a case where the voltage of the electric power supplied from the USB cable 7 drops to 4.75V or less, the reset IC 203 stops the output of the USB power-on signal, and the reset IC 204 outputs the low USB power signal.

The five volt switching circuit 13 is connected to the DC/DC power supply unit 14 via a predetermined cable. The five volt switching circuit 13 makes a determination as to whether the electric power source should be the electric power from the LAN cable 6 or the electric power from the USB cable 7 based on two signals: the LAN power-on signal supplied from the LAN incoming electricity detection circuit 10 indicating whether the LAN power source is turned on; and the USB power-on signal supplied from the USB incoming electricity detection circuit 12 indicating whether the USB power source is turned on. The five volt switching circuit 13 switches the output of the electric power so that the electric power source determined by the five volt switching circuit 13 supplies the electric power to the DC/DC power supply unit 14. The five volt switching circuit 13 is connected to the main power supply switching circuit 21 via a LAN five volt power-on second data wiring 54 and a USB five volt power-on second data wiring 55. In a case where the electric power source is switched to the supply from the LAN cable 6, the five volt switching circuit 13 outputs a LAN five volt power-on second signal to the main power supply switching circuit 21 to indicate that the electric power is supplied from the LAN cable 6. In a case where the electric power source is switched to the supply from the USB cable 7, the five volt switching circuit 13 outputs a USB five volt power-on second signal to the main power supply switching circuit 21 to indicate that the electric power is supplied from the USB cable 7.

Figure 5:
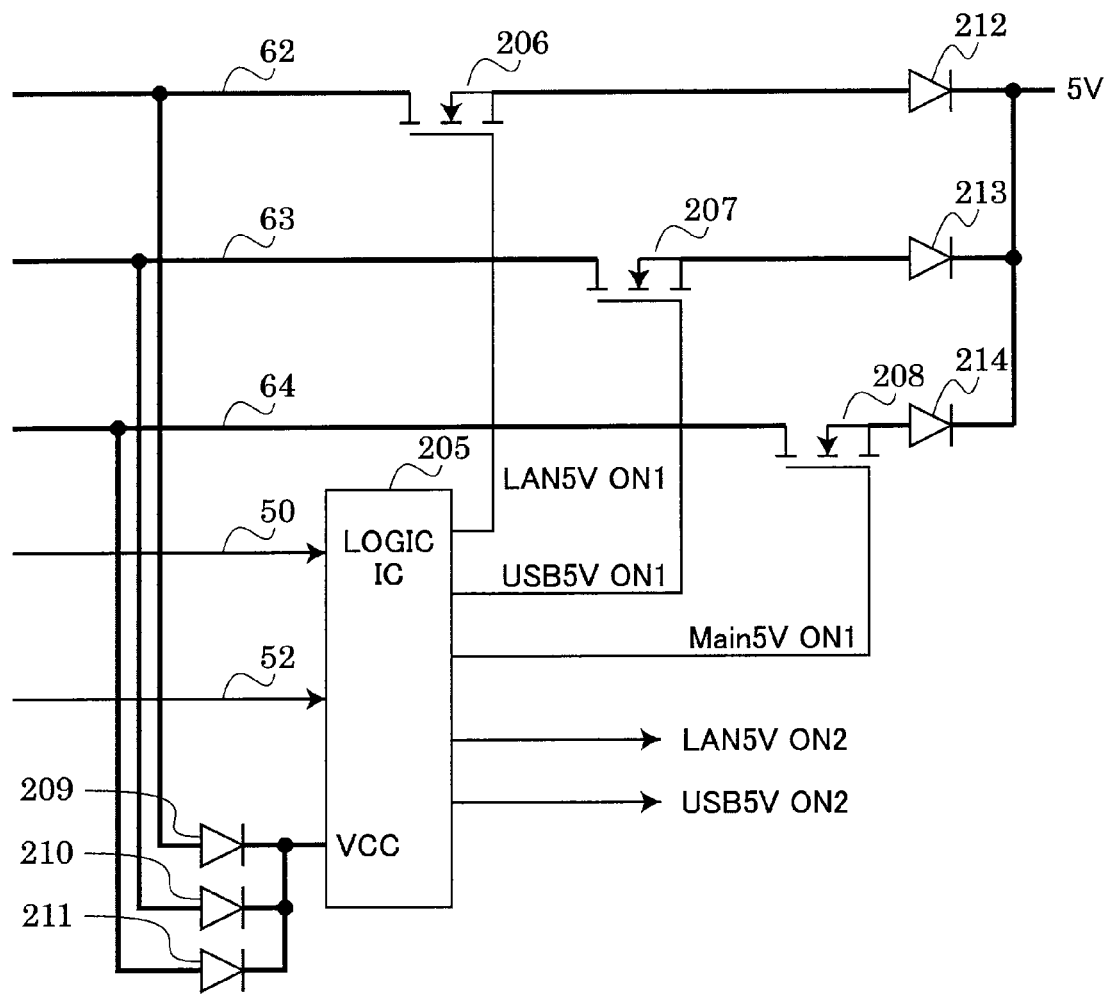
FIG. 5 is a figure describing the circuit configuration of a five volt switching circuit according to the first embodiment.

FIG. 5 is a figure describing the circuit configuration of the five volt switching circuit 13. The five volt switching circuit 13 has a logic IC 205, output ON/OFF FETs 206 to 208, and diodes 209 to 214.

The logic IC 205 controls the output ON/OFF FETs 206 to 208 based on the LAN power-on signal supplied from the LAN incoming electricity detection circuit 10 and the USB power-on signal from the USB incoming electricity detection circuit 12. The logic IC 205 is connected to each of the LAN DC/DC power supply unit 9, the electric power from the USB cable 7, and the electric power from the AC/DC power supply unit 4 via the diodes 209 to 211, so that the logic IC 205 can handle the electric power therefrom.

The FET 206 is an FET for supplying the electric power from the LAN five volt wiring 62. The FET 206 outputs the electric power in a case where the LAN incoming electricity detection circuit 10 outputs the LAN power-on signal to the logic IC 205 which outputs a LAN five volt power-on first signal to the FET 206. The FET 207 is an FET for controlling the supply of the electric power from the USB five volt wiring 63. The FET 207 outputs the electricity in a case where the USB incoming electricity detection circuit 12 outputs the USB power-on signal to the logic IC 205 which outputs a USB five volt power-on first signal to the FET 207. The FET 208 is an FET for controlling the supply of the electric power from the main five volt wiring 64. The FET 208 outputs the electric power in a case where a main five volt power-on first signal is outputted to the FET 208 by the logic IC 205.

In a case where the LAN power-on signal is inputted to the logic IC 205, the logic IC 205 outputs the LAN five volt power-on second signal to the main power supply switching circuit 21 via the LAN five volt power-on second data wiring 54. In a case where the USB power-on signal is inputted to the logic IC 205, the logic IC 205 outputs the USB five volt power-on second signal to the main power supply switching circuit 21 via the USB five volt power-on second data wiring 55.

The diode 209 is arranged between the LAN DC/DC power supply unit 9 and the logic IC 205. The diode 209 prevents a reverse current to the LAN DC/DC power supply unit 9 while the LAN five volt wiring 62 does not supply the electric power but another power supply is supplying the electric power to the logic IC 205. The diode 210 is arranged between the protection circuit 11 and the logic IC 205. The diode 210 prevents a reverse current to the protection circuit 11 while the USB five volt cable 6 does not supply the electric power but another power supply is supplying the electric power to the logic IC 205. The diode 211 is arranged between the AC/DC power supply unit 4 and the logic IC 205. The diode 211 prevents a reverse current to the AC/DC power supply unit 4 while the electric power is not supplied from the main five volt wiring 64 but another power supply is supplying the electric power to the logic IC 205. The diode 212 is arranged at the electric power output side of the FET 206. The diode 212 prevents a reverse current from another electric power source while the FET 206 is not outputting the electric power. The diode 212 also prevents a reverse current in a case where the electric power is supplied from multiple electric power sources by mistake. Other diodes 213 and 214 have similar functions.

FIG. 6 is a figure showing a switching logic of the logic IC 205 constituting the five volt switching circuit 13. In a case where the LAN incoming electricity detection circuit 10 outputs the LAN power-on signal, the logic IC 205 determines that the supply from the LAN five volt wiring 62 should be the electric power source. In a case where the LAN power-on signal is not outputted but the USB power-on signal is outputted, the logic IC 205 determines that the supply from the USB five volt wiring 63 should be the electric power source. Furthermore, in a case where neither of the LAN power-on signal nor the USB power-on signal is outputted, the logic IC 205 determines that the supply from the main five volt wiring 64 should be the electric power source.

The DC/DC power supply unit 14 converts the electric power form the five volt switching circuit 13, and supplies the converted electric power to the CPU 15, the RAM 16, the LAN controller 17, the USB controller 18, the peripheral controller 19, and the USB power supply OFF/ON circuit 20.

The CPU 15 controls the controller 2. The RAM 16 is a random access memory that can be directly or indirectly accessed by each device constituting the processor. The LAN controller 17 controls communication with the host machine via the LAN cable 6.

The USB controller 18 controls communication with the host, the USB hub, or the like over the USB cable 7. The USB controller 18 is connected to the USB power supply OFF/ON circuit 20 via a predetermined cable, and is supplied with the electric power via the USB power supply OFF/ON circuit 20.

The peripheral controller 19 is connected to the AC/DC power supply unit 4 via the print power-on data wiring 57 and the print power status data wiring 58. The peripheral controller 19 is connected to the print unit 3 via predetermined data wirings 60 and 61. According to instructions given from the CPU 1, the peripheral controller 19 controls and monitors power supplying operation of the AC/DC power supply unit 4, and supplies a print instruction to the print unit 3. To turn on the print unit 3, the peripheral controller 19 outputs a print power-on signal to the AC/DC power supply unit 4 to instruct the AC/DC power supply unit 4 to turn on the print unit 3. Upon receiving the print power-on signal, the AC/DC power supply unit 4 begins to supply the electric power to the print unit 3. The AC/DC power supply unit 4 also outputs a print power status signal to the peripheral controller 19 to indicate that the output to the print unit 3 has begun. The peripheral controller 19 monitors the print power status signal from the AC/DC power supply unit 4.

In a case where the USB power supply OFF/ON circuit 20 receives from the USB incoming electricity detection circuit 12 the USB power-on signal indicating that the USB cable 7 is providing the electric power, the USB power supply OFF/ON circuit 20 turns on the USB controller 18. In a case where the USB power supply OFF/ON circuit 20 does not receive the USB power-on signal, the USB power supply OFF/ON circuit 20 turns off the USB controller 18.

Figure 7:
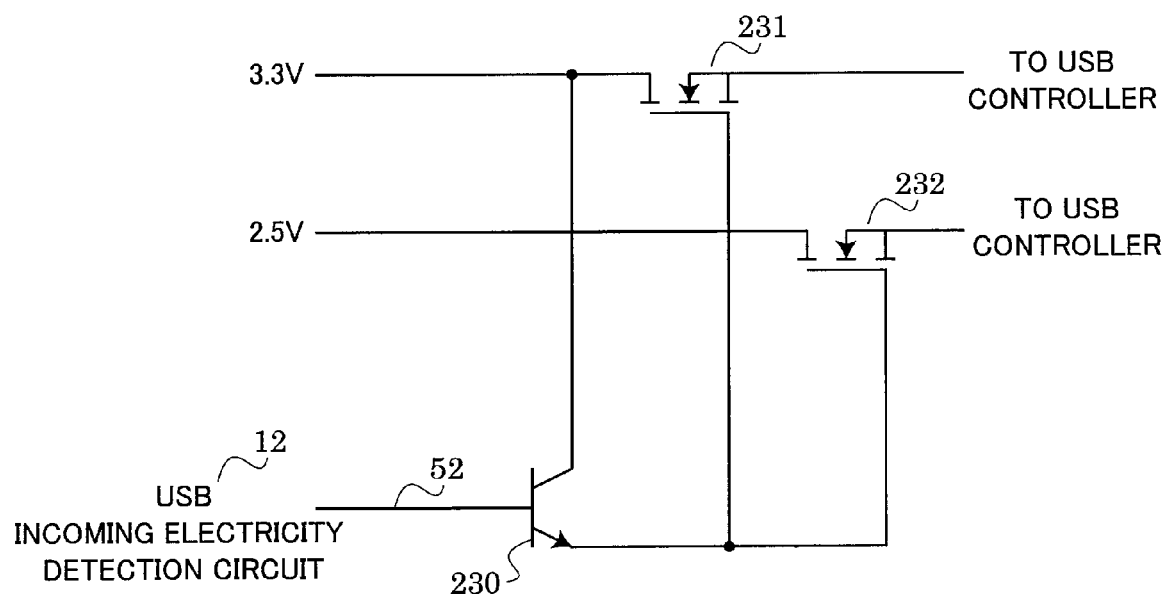
FIG. 7 is a figure describing the circuit configuration of a USB power supply OFF/ON circuit according to the first embodiment.

FIG. 7 is a figure describing the circuit configuration of the USB power supply OFF/ON circuit 20 according to this embodiment. The USB power supply OFF/ON circuit 20 has the transistor 230 and the FETs 231 and 232. In a case where the USB power supply OFF/ON circuit 20 receives the USB power-on signal from the USB incoming electricity detection circuit 12, the USB power supply OFF/ON circuit 20 supplies the electric power from the DC/DC power supply unit 14 to the USB controller 18. The transistor 230 turns on and off the FET 231 and the FET 232 according to the USB power-on signal from the USB incoming electricity detection circuit 12. The FET 231 supplies the electric power of 3.3 volt to the USB controller 18 according to an instruction from the transistor 230. The FET 232 supplies the electric power of 2.5 volt to the USB controller 18 according to an instruction from the transistor 230.

The main power supply switching circuit 21 controls the AC/DC power supply unit 4 according to a determination made based on the low LAN power signal from the LAN incoming electricity detection circuit 10, the low USB power signal from the USB incoming electricity detection circuit 12, the LAN five volt power-on second signal from the five volt switching circuit 13, and the USB five volt power-on second signal from the five volt switching circuit 13. The main power supply switching circuit 21 is connected to the AC/DC power supply unit 4 via the main power-on data cable 56. In a case where the main power supply switching circuit 21 outputs a main power-on signal to the AC/DC power supply unit 4, the AC/DC power supply unit 4 begins to supply the electric power to the controller 2. In a case where the main power supply switching circuit 21 does not output the main power-on signal, the AC/DC power supply unit 4 stops supplying the electric power to the controller 2. The power supply switch 30 is a switch for starting or stopping the supply of the electric power from an external power source such as a wall outlet and the like.

Figure 8:
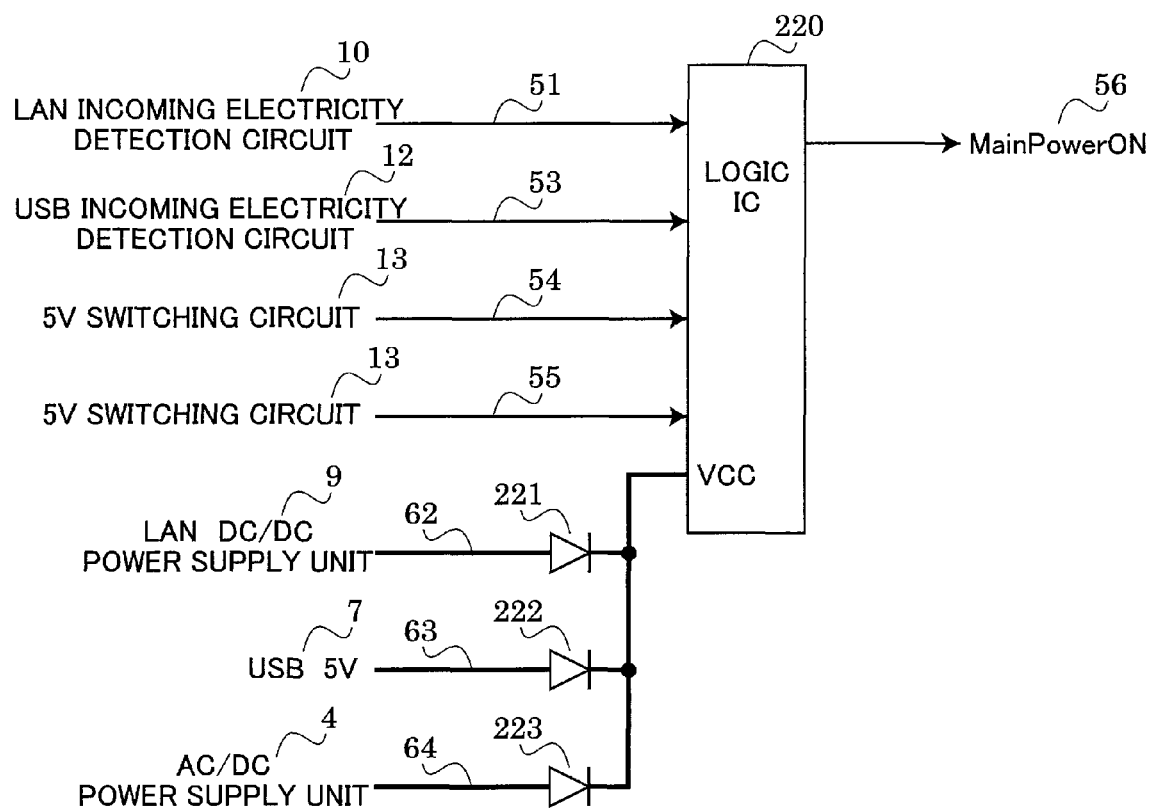
FIG. 8 is a figure describing the circuit configuration of a main power supply switching circuit according to the first embodiment.

FIG. 8 is a diagram describing the circuit configuration of the main power supply switching circuit 21. The main power supply switching circuit 21 has a logic IC 220 and diodes 221 to 223. The main power supply switching circuit 21 makes a determination as to whether the main power-on signal should be outputted to the AC/DC power supply unit 4 based on the low LAN power signal from the LAN incoming electricity detection circuit 10, the low USB power signal from the USB incoming electricity detection circuit 12, the LAN five volt power-on second signal from the five volt switching circuit 13, and the USB five volt power-on second signal from the five volt switching circuit 13 The logic IC 220 is connected to each of the electric power from the LAN DC/DC power supply unit 9, the electric power from the USB cable 7, and the electric power from the AC/DC power supply unit 4 via the diodes 221 to 223, so that the logic IC 220 can handle the electric power therefrom.

FIG. 9 is a figure describing a switching logic of the logic IC 220 constituting the main power supply switching circuit 21. In a case where the logic IC 220 receives either of the LAN five volt power-on second signal or the USB five volt power-on second signal, the logic IC 220 determines that either of the supply of the electric power from the LAN five volt wiring 62 or the supply of the electric power from the USB five volt wiring 63 is available, and stops outputting the main power-on signal to stop the supply of the electric power from the AC/DC power supply unit 4 to the controller 2. In this case, the logic IC 220 does not output the main power-on signal even if the logic IC 220 receives a power low signal from a non-used electric power source. However, the logic IC 220 outputs the main power-on signal if the logic IC 220 receives a power low signal from a used electric power source. In a case where the logic IC 220 receives both of the low LAN power signal and the low USB power signal, the logic IC 220 outputs the main power-on signal. In a case where the logic IC 220 receives neither of the LAN five volt power-on second signal nor the five volt power-on second signal, the logic IC 220 outputs the main power-on signal to the AC/DC power supply unit 4.

Figure 10:
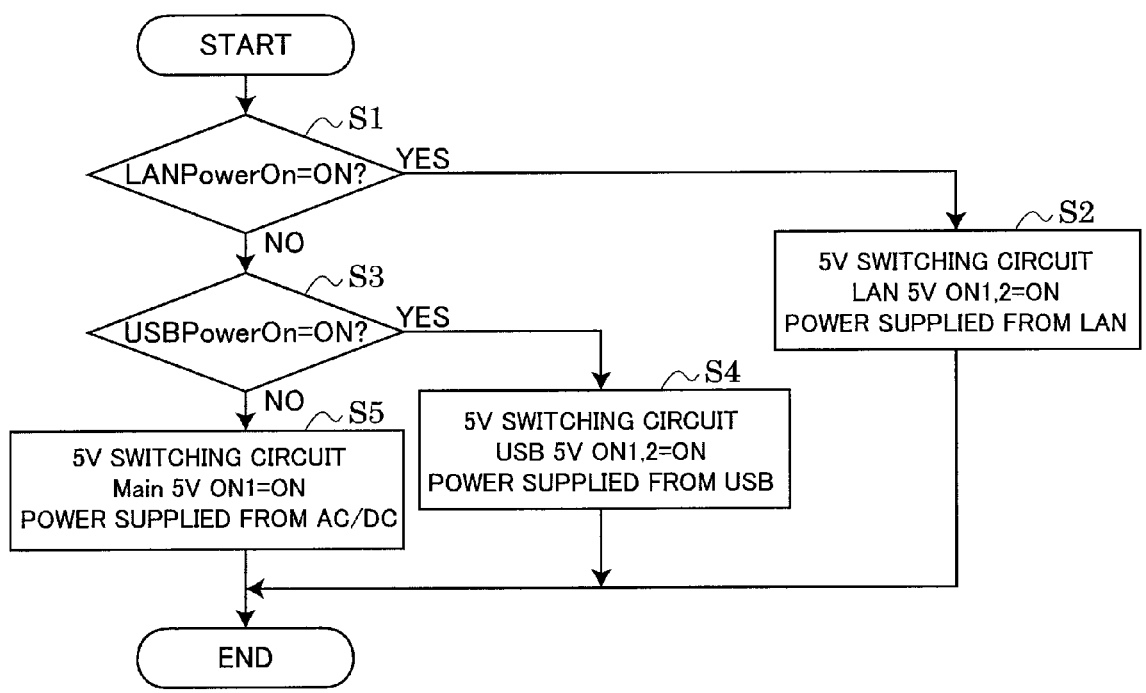
FIG. 10 is a flowchart describing the operation of the five volt switching circuit.

The operation of the printer 1 according to this embodiment will be hereinafter described with reference to flowcharts and time charts. FIG. 10 is a flowchart describing the operation of the five volt switching circuit 13. First, the logic IC 205 in the five volt switching circuit 13 makes a determination as to whether the logic IC 205 has received from the LAN incoming electricity detection circuit 10 the LAN power-on signal indicating that the electric power supplied from the LAN five volt wiring 62 is within the operable range of the DC/DC power supply unit 14 (S1). At S1, in a case where the logic IC 205 determines that the LAN power-on signal is inputted, namely, where LAN Power On=ON (S1, YES), the logic IC 205 outputs the LAN five volt power-on first signal and the LAN five volt power-on second signal to indicate that the output voltage of the electric power from the LAN five volt wiring 62 has reached 5 volt. Thereby, the FET 206 as shown in FIG. 5 is turned on, and the five volt switching circuit 13 outputs the electric power from the LAN five volt wiring 62 (S2). In a case where the logic IC 205 determines that the LAN power-on signal is not inputted, namely, where LAN Power On=OFF (S1, NO), the logic IC 205 makes a determination as to whether the logic IC 205 has received from the USB incoming electricity detection circuit 12 the USB power-on signal indicating that the electric power supplied from the USB five volt wiring 63 is within the operable range of the DC/DC power supply unit 14 (S3). At S3, in a case where the logic IC 205 determines that the USB power-on signal is inputted, namely, where USB Power On=ON (S3, YES), the logic IC 205 outputs the USB five volt power-on first signal and USB five volt power-on second signal to indicate that the output voltage of the electric power from the USB five volt wiring 63 has reached 5 volt. Thereby, the FET 207 as shown in FIG. 5 is turned on, and the electric power from the USB five volt wiring 63 is outputted from the five volt switching circuit 13 (S4). At S3, in a case where the logic IC 205 determines that the USB power-on signal is not inputted, namely, where USB Power On=OFF (S3, NO), the logic IC 205 outputs the main five volt power-on first signal. Thereby, the FET 208 shown in FIG. 5 is turned on, and the electric power from the main five volt wiring 64 is outputted from the five volt switching circuit 13 (S5).

Figure 11:
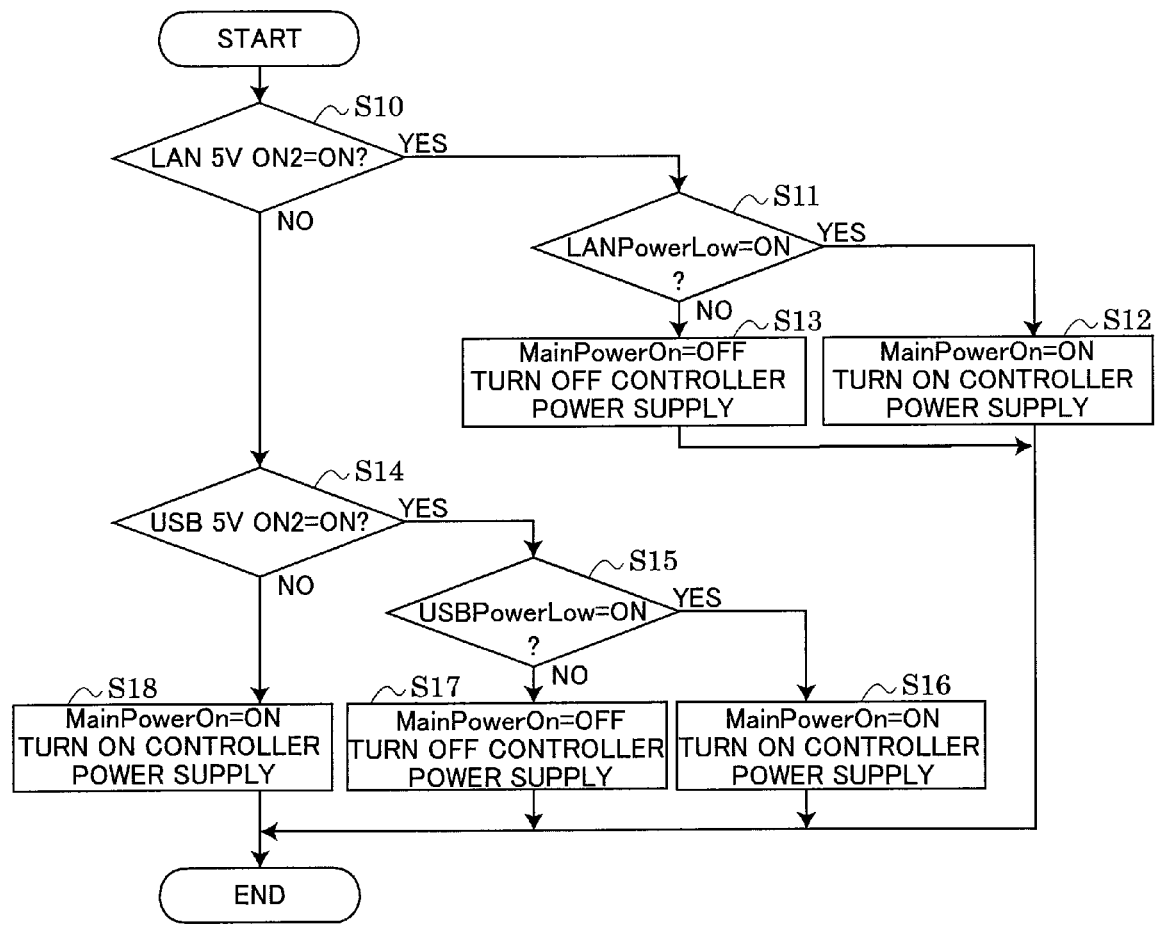
FIG. 11 is a flowchart describing the operation of the main power supply switching circuit.

FIG. 11 is a flowchart describing the operation of the main power supply switching circuit 21. First, the logic IC 220 in the main power supply switching circuit 21 makes a determination as to whether the signal outputted from the five volt switching circuit 13 is the LAN five volt power-on second signal (S10). At S10, in a case where the logic IC 220 determines that the LAN five volt power-on second signal is inputted, namely, where LAN 5V On 2=ON (S10, YES), the logic IC 220 makes a determination as to whether the logic IC 220 has received from the LAN incoming electricity detection circuit 10 the low LAN power signal indicating that the electric power supplied from the LAN five volt wiring 62 drops (S11). At S11, in a case where the logic IC 220 determines that the low LAN power signal is inputted, namely, where Low LAN power=ON (S11, YES), the logic IC 220 outputs the main power-on signal to the AC/DC power supply unit 4 (S12). Upon receiving the main power-on signal, the AC/DC power supply unit 4 begins to supply the electric power via the main five volt wiring 64. It should be noted that if the supply of the electric power via the main five volt wiring 64 has already begun, the AC/DC power supply unit 4 does nothing. At S11, in a case where the logic IC 220 determines that the low LAN power signal is not inputted, namely, where Low LAN power=OFF (S11, NO), the logic IC 220 does not output the main power-on signal (S13). The AC/DC power supply unit 4 does not receive the main power-on signal, and accordingly, the AC/DC power supply unit 4 stops supplying the electricity from the main five volt wiring 64. It should be noted that if the supply of the electric power from the main five volt wiring 64 has already stopped, the AC/DC power supply unit 4 does nothing.

At step S10, in a case where the logic IC 220 determines that the LAN five volt power-on second signal is not inputted, namely, where LAN 5V On 2=OFF (S10, NO), the logic IC 220 makes a determination as to whether the signal outputted from the five volt switching circuit 13 is the USB five volt power-on second signal (S14). At S14, in a case where the logic IC 220 determines that the USB five volt power-on second signal is inputted, namely, USB 5V On 2=ON (S14, YES), the logic IC 220 makes a determination as to whether the logic IC 220 has received from the USB incoming electricity detection circuit 12 the low USB power signal indicating that the electric power supplied from the USB five volt wiring 63 drops (S15). At S15, in a case where the logic IC 220 determines that the low USB power signal is inputted, namely, where USB Power Low=ON (S15, YES), the logic IC 220 outputs the main power-on signal to the AC/DC power supply unit 4 (S16). Upon receiving the main power-on signal, the AC/DC power supply unit 4 begins to supply the electric power via the main five volt wiring 64. It should be noted that if the AC/DC power supply unit 4 has already started to supply the electric power via the main five volt wiring 64, the AC/DC power supply unit 4 does nothing. At S15, in a case where the logic IC 220 determines that the low USB power signal is not inputted, namely, where USB Power Low=OFF (S15, NO), the logic IC 220 does not output the main power-on signal (S17). The AC/DC power supply unit 4 does not receive the main power-on signal, and accordingly, the AC/DC power supply unit 4 stops supplying the electric power via the main five volt wiring 64. It should be noted that if the AC/DC power supply unit 4 has already started to supply the electric power via the main five volt wiring 64, the AC/DC power supply unit 4 does nothing. At S14, in a case where the logic IC 220 determines that the USB five volt power-on second signal is not inputted, namely, USB 5V On 2=OFF (S14, NO), the logic IC 220 outputs the main power-on signal to the AC/DC power supply unit 4 (S18). Upon receiving the main power-on signal, the AC/DC power supply unit 4 begins to supply the electric power via the main five volt wiring 64. It should be noted that if the AC/DC power supply unit 4 has already started to supply the electric power via the main five volt wiring 64, the AC/DC power supply unit 4 does nothing.

Figure 12:
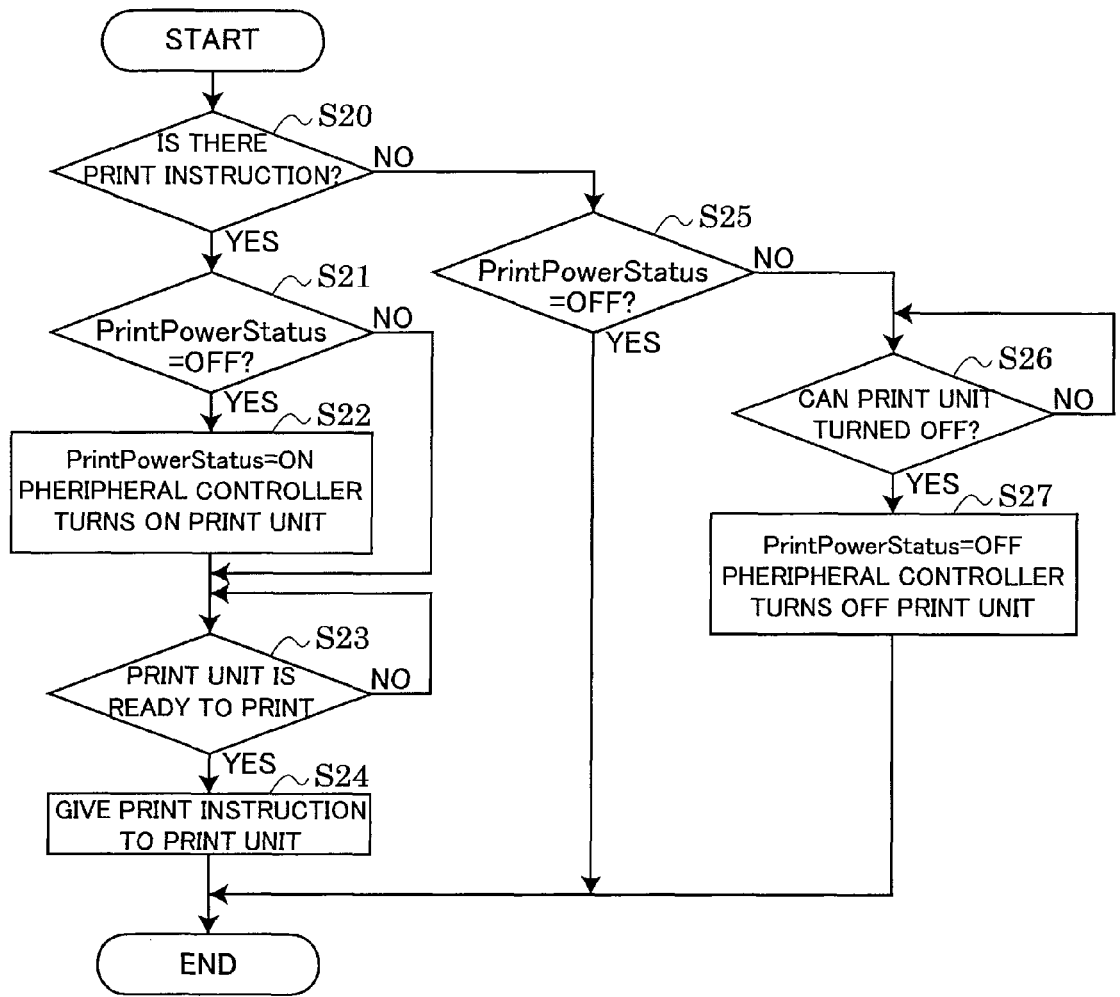
FIG. 12 is a flowchart describing a transition between a standby state and a printing operation state in a printer 1.

FIG. 12 is a flowchart describing a transition between a standby state and a printing operation state in a printer 1. First, the CPU 15 makes a determination as to whether there exists the print instruction given from the host machine (S20). In a case where the CPU 15 determines that there exists the print instruction (S20, YES), the CPU 15 gives an instruction to the peripheral controller 19 to monitor the print power status signal to make a determination as to whether the electric power is supplied to the print unit 3 from the AC/DC power supply unit 4 via the print power wiring 59 (S21). In a case where the electric power is supplied to the print unit 3 from the AC/DC power supply unit 4, namely, where Print Power Status=ON (S21, NO), the CPU 15 proceeds to S23. In a case where the electric power is not supplied to the print unit 3 from the AC/DC power supply unit 4, namely, where Print Power Status=OFF (S21, YES), the CPU 15 gives an instruction to the peripheral controller 19 to output the print power-on signal to the AC/DC power supply unit 4. Upon receiving the instruction, the peripheral controller 19 outputs the print power-on signal to the AC/DC power supply unit 4. Upon receiving the print power-on signal, the AC/DC power supply unit 4 begins to supply the electric power to the print unit 3 (S22). After the AC/DC power supply unit 4 has begun to supply the electric power to the print unit 3, the CPU 15 causes the peripheral controller 19 to monitor whether the print unit 3 has become ready to print. In a case where the print unit 3 becomes ready to print (S23, YES), the CPU 15 gives an instruction to the peripheral controller 19 to transmit print data to the print unit 3 (S24).

At S20, in a case where the CPU 15 determines that there does not exist the print instruction from the host machine (S20, NO), the CPU 15 gives an instruction to the peripheral controller 19 to monitor the print power status signal to make a determination as to whether the electric power is supplied to the print unit 3 from the AC/DC power supply unit 4 via the print power wiring 59 (S25). In a case where the electric power is supplied to the print unit 3 from the AC/DC power supply unit 4 (S25, NO), the CPU 15 makes a determination as to whether the print unit 3 can be stopped by communicating with the print unit 3 (S26). At this moment, in a case where the print unit 3 cannot be stopped due to a reason such as that the print unit 3 is performing printing (S26, NO), the CPU 15 waits until the print unit 3 becomes ready to stop. In a case where the print unit 3 can be stopped (S26, YES), the CPU 15 gives an instruction to the peripheral controller 19 to stop the print power-on signal outputted to the AC/DC power supply unit 4. Upon receiving the instruction, the peripheral controller 19 stops the output of the print power-on signal. Thereby, the AC/DC power supply unit 4 stops supplying the electric power to the print unit 3 (Print Power Status=OFF, S27).

Figure 13:
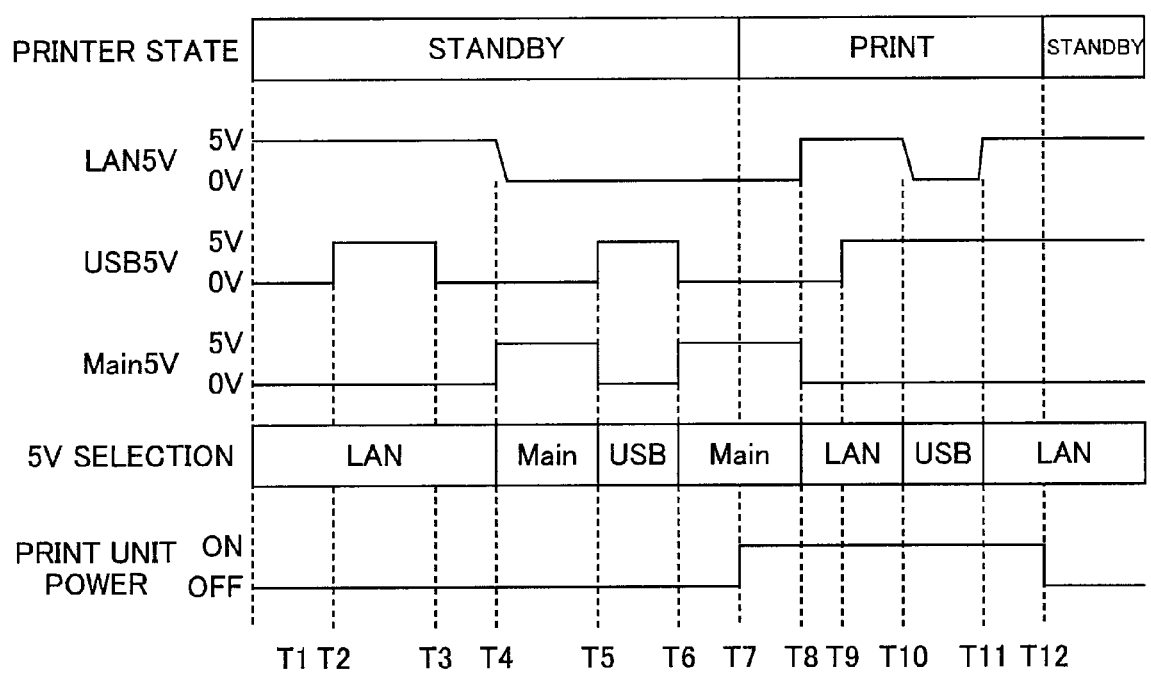
FIG. 13 is a time chart describing an example of operation of the printer 1.

FIG. 13 is a flowchart describing an example of operation of the printer 1. At T1 when the printer 1 is waiting, the electric power (voltage 5 volt) is supplied to the printer 1 via the LAN cable 6. When the USB cable 7 is connected to the printer 1, the electric power from the USB cable 7 begins to be supplied, but the electric power source is not changed because the supply of the electric power from the LAN cable 6 has higher priority than the supply of the electric power from the USB cable 7 (T2). Then, the electric power from the USB cable 7 stops due to a reason such as disconnection of the USB cable 7 from the printer 1, bad electrical contact, and the like. However, the electric power source is not changed because the supply of the electric power from the LAN cable 6 continues (T3). At T4, the supply of the electric power from the LAN cable 6 stops due to a reason such as disconnection of the LAN cable 6, bad electrical contact, and the like. At this moment, the LAN incoming electricity detection circuit 10 detects that the voltage of the electric power supplied from the LAN cable 6 drops to 4.7 volt or less, and outputs the low LAN power signal to the main power supply switching circuit 21. Upon receiving the low LAN power signal, the main power supply switching circuit 21 outputs the main power-on signal to the AC/DC power supply unit 4. Upon receiving the main power-on signal, the AC/DC power supply unit 4 supplies the electric power to the five volt switching circuit 13 via the main five volt wiring 64. Simultaneously with this, the LAN incoming electricity detection circuit 10 stops the output of the LAN power-on signal. Thereby, the five volt switching circuit 13 switches the electric power source to the AC/DC power supply unit 4. Subsequently, at T5, the USB cable 7 resumes to supply the electric power, and the electric power source is switched from the AC/DC power supply unit 4 to the USB cable 7. That is, when the USB cable 7 is connected to the printer 1, the USB incoming electricity detection circuit 12 outputs to the five volt switching circuit 13 the USB power-on signal indicating that the electric power supplied form the USB cable 7 is within the operable range of the DC/DC power supply unit 14. Upon receiving the USB power-on signal, the five volt switching circuit 13 switches the electric power source form the AC/DC power supply unit 4 to the USB cable 7. At this moment, the USB incoming electricity detection circuit 12 stops the output of the low USB power signal outputted to the main power supply switching circuit 21. In response to the stop of the low USB power signal, the main power supply switching circuit 21 stops the output of the main power-on signal outputted to the AC/DC power supply unit 4. Thereby, the AC/DC power supply unit 4 stops the supply of the electric power to the five volt switching circuit 13. At T6, the supply of the electric power stops due to a reason such as disconnection of the USB cable 7, bad electrical contact, and the like. When the USB incoming electricity detection circuit 12 detects that the voltage of the electric power supplied form the USB cable 7 drops to 4.7 volt or less, the USB incoming electricity detection circuit 12 outputs the low USB power signal to the main power supply switching circuit 21. Upon receiving the low USB power signal, the main power supply switching circuit 21 outputs the main power-on signal to the AC/DC power supply unit 4. Upon receiving the main power-on signal, the AC/DC power supply unit 4 supplies the electricity to five volt switching circuit 13 via the main five volt wiring 64. Simultaneously with this, the USB incoming electricity detection circuit 12 stops the output of the USB power-on signal. Thereby, the five volt switching circuit 13 switches the electric power source to the AC/DC power supply unit 4.

Then, the CPU 15 receives the print instruction from the host machine via the LAN cable 6 connected to the printer 1, and the CPU 15 beings a print processing (T7). The CPU 15 gives an instruction to the peripheral controller 19 to output the print power-on signal to the AC/DC power supply unit 4. Upon receiving the print power-on signal, the peripheral controller 19 outputs the print power-on signal to the AC/DC power supply unit 4. Upon receiving the print power-on signal, the AC/DC power supply unit 4 begins to supply the electric power to the print unit 3. During the print processing, the LAN cable 6 resumes to supply the electric power (T8). That is, the LAN incoming electricity detection circuit 10 outputs to the five volt switching circuit 13 the LAN power-on signal indicating that the electric power supplied from the LAN cable 6 is within the operable range of the DC/DC power supply unit 14. Upon receiving the LAN power-on signal, the five volt switching circuit 13 switches the electric power source from the AC/DC power supply unit 4 to the LAN cable 6. At this moment, the LAN incoming electricity detection circuit 10 stops the output of the low LAN power signal outputted to the main power supply switching circuit 21. In response to the stop of the low LAN power signal, the main power supply switching circuit 21 stops the output of the main power-on signal to the AC/DC power supply unit 4. Thereby, the AC/DC power supply unit 4 stops supplying the electric power to the five volt switching circuit 13. At T9, the USB cable 7 resumes to supply the electric power, but the electric power source is not changed because the electric power from the LAN cable 6 continues. Subsequently, at T10, the supply of the electric power from the LAN cable 6 stops due to a reason such as disconnection of the LAN cable 6, bad electrical contact, and the like. In response, the electric power source is changed from the LAN cable 6 to the USB cable 7. That is, when the LAN incoming electricity detection circuit 10 detects a drop of the voltage (equal to or less than 4.7 volt) of the electric power supplied from the LAN cable 6, the LAN incoming electricity detection circuit 10 outputs the low LAN power signal to the main power supply switching circuit 21. At this moment, the low USB power signal is not inputted to the main power supply switching circuit 21, and accordingly, the main power supply switching circuit 21 does not output the main power-on signal to the AC/DC power supply unit 4. Thus, the supply of the electric power from the USB cable 7 begins. Simultaneously with this, the LAN incoming electricity detection circuit 10 stops the output of the LAN power-on signal. Thereby, the five volt switching circuit 13 changes the electric power source to the USB cable 7. The LAN cable 6 resumes to supply the electric power. The LAN incoming electricity detection circuit 10 outputs to the five volt switching circuit 13 the LAN power-on signal indicating that the electric power supplied from the LAN cable 6 is within the operable range of the DC/DC power supply unit 14. Upon receiving the LAN power-on signal, the five volt switching circuit 13 switches the electric power source from the USB cable 7 to the LAN cable 6 (S11). When the print processing finishes, the CPU 15 makes a determination as to whether the print unit 3 can be stopped. In a case where the print unit 3 cannot be stopped due to a reason such as that the print unit 3 is performing printing, the CPU 15 waits until the print unit 3 becomes ready to stop. In a case where the print unit 3 can be stopped, the CPU 15 gives an instruction to the peripheral controller 19 to stop the print power-on signal outputted to the AC/DC power supply unit 4. Upon receiving the instruction, the peripheral controller 19 stops the output of the print power-on signal. Thereby, the AC/DC power supply unit 4 stops supplying the electric power to the print unit 3.

As hereinabove described, the printer 1 according to the first embodiment is connected to multiple communication media such as the LAN cable and the USB cable capable of providing the electric power. The printer 1 can switch the source of the electric power according to the incoming electric powers in each of the communication media. Thus, even where the supply of the electric power from one of the multiple communication media becomes unstable, the image forming apparatus can receive the electric power from another communication medium. That is, it is not necessary to perform an initial processing every time one of the communication media stops supplying the electric power. The printer 1 can greatly reduce electric power consumption in the standby state.

Second Embodiment

Figure 14:
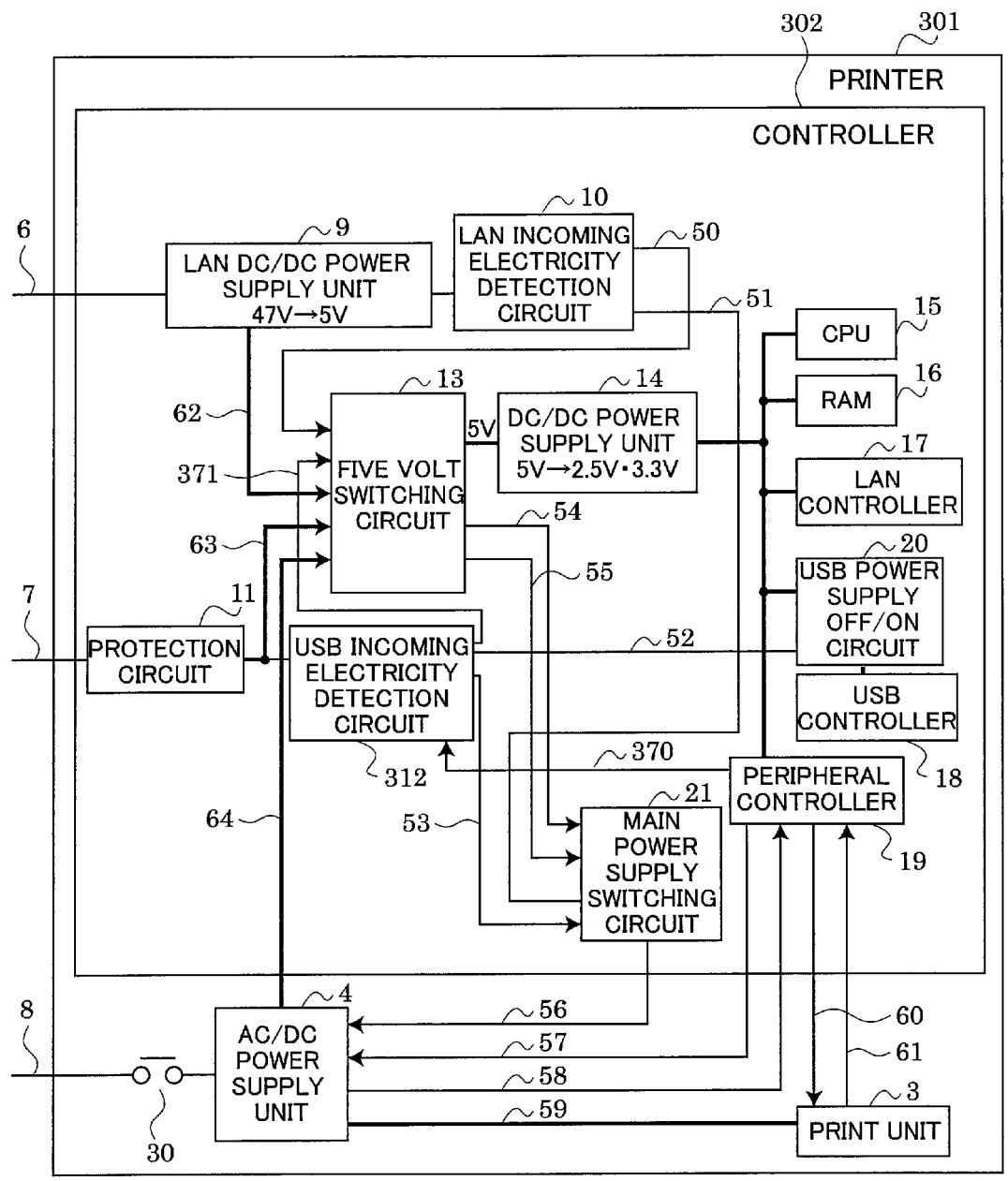
FIG. 14 is a figure describing an essential portion of a printer 301 according to the second embodiment.

FIG. 14 is a block diagram describing an essential portion of a printer 301 as an example of the information processing apparatus according to the second embodiment. The printer 301 according to the second embodiment is substantially the same as the printer 1 according to the first embodiment. In the below description, only the difference from the first embodiment will be hereinafter described. The printer 301 has a controller 302 in place of the controller 2, a USB incoming electricity detection circuit 312 in place of the USB incoming electricity detection circuit 12, a five volt switching circuit 313 in place of the five volt switching circuit 13, and a peripheral controller 319 in place of the peripheral controller 19. Other than the above, the printer 301 is substantially the same as the printer 1.

The controller 302 is different from the controller 2 according to the first embodiment in that the controller 302 consumes much power. It is assumed that the controller 302 cannot operate with 100 mA, which is the maximum current initially allowed to be drawn from the USB cable without authorization.

The USB incoming electricity detection circuit 312 is connected to the USB power supply OFF/ON circuit 20 via a USB power-on wiring 52. When the electric power supplied by the USB cable 7 is within the operable range of the DC/DC power supply unit 14, the USB incoming electricity detection circuit 312 outputs to the USB power supply OFF/ON circuit 20 the USB power-on signal indicating that the USB cable is providing the electric power. The USB incoming electricity detection circuit 312 is connected to the main power supply switching circuit 21 via the low USB power data wiring 53. In a case where the electric power supplied from the USB cable 7 drops within the operable range of the DC/DC power supply unit 14, the USB incoming electricity detection circuit 312 outputs the low USB power signal to the main power supply switching circuit 21. The USB incoming electricity detection circuit 312 is connected to the five volt switching circuit 13 via a USB power-ok data wiring 371. The USB incoming electricity detection circuit 312 is connected to the peripheral controller 319 via a USB 500 mA-ok data wiring 370. While the USB incoming electricity detection circuit 312 outputs the USB power-on signal and the peripheral controller 19 outputs a USB 500 mA-ok signal to the USB incoming electricity detection circuit 312, the USB incoming electricity detection circuit 312 assumes that the USB cable 7 can provide the electric power at the current of 500 mA, and the USB incoming electricity detection circuit 312 outputs the USB power-ok signal to the five volt switching circuit 13.

Figure 15:
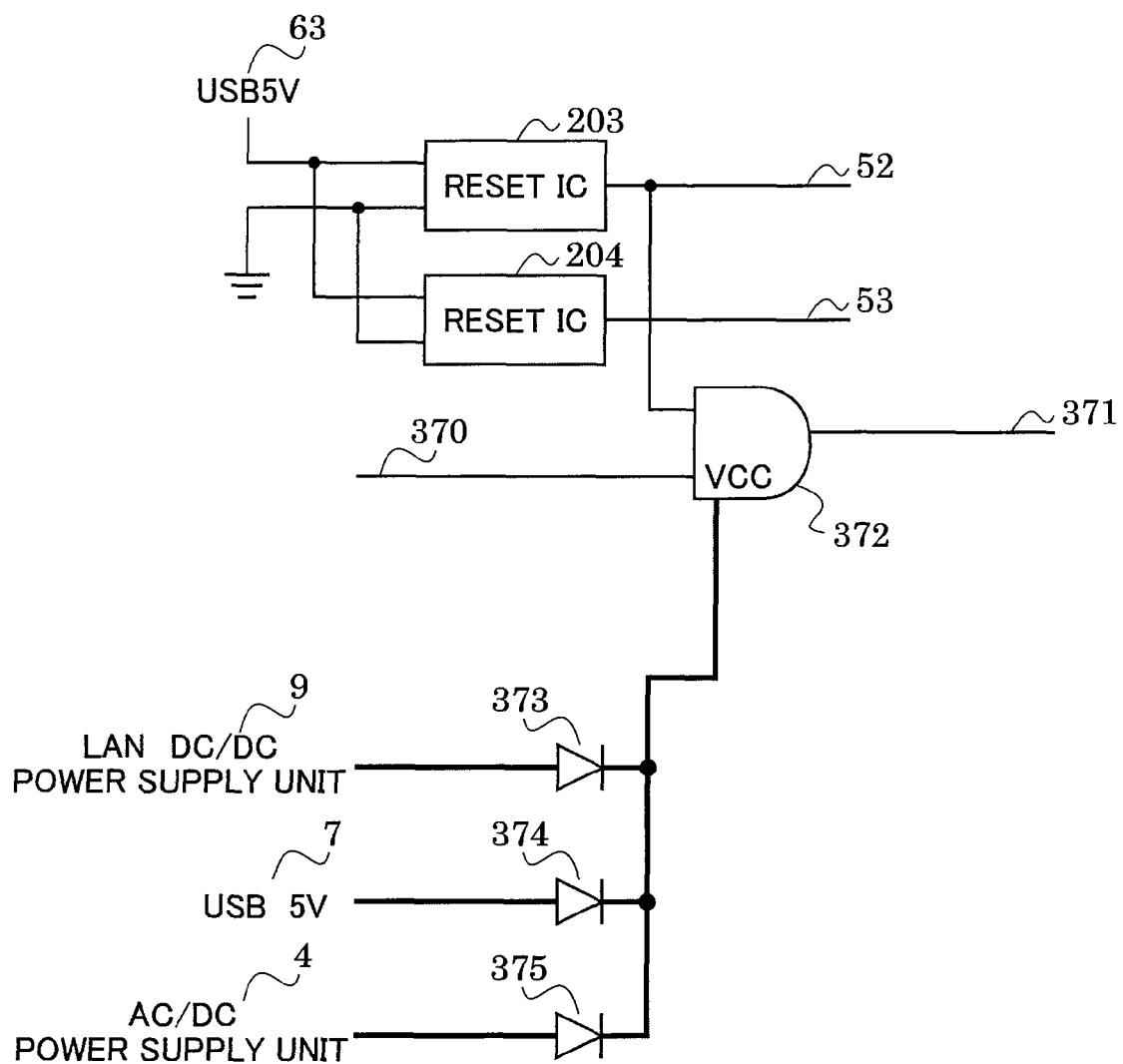
FIG. 15 is a figure describing the circuit configuration of a USB incoming electricity detection circuit according to the second embodiment.

FIG. 15 is a figure describing the circuit configuration of the USB incoming electricity detection circuit 312 according to this embodiment. In addition to the units of the USB incoming electricity detection circuit 12 according to the first embodiment, the USB incoming electricity detection circuit 312 has an AND circuit 372 and diodes 373 to 375. The AND circuit 372 uses the electric power supplied from the USB five volt wiring 63. The AND circuit 372 outputs the USB power-on signal. In a case where the AND circuit 372 receives the USB 500 mA-ok signal from the peripheral controller 319, the AND circuit 372 outputs the USB power-ok signal to the five volt switching circuit 13. The AND circuit 372 is connected to each of the electric power from the LAN DC/DC power supply unit 9, the electric power from the USB cable 7, and the electric power from the AC/DC power supply unit 4 via the diodes 373 to 375, so that the AND circuit 372 the logic IC 205 can handle the electric power therefrom. Alternatively, the supply of the electric power may be shared with the logic IC 380 constituting the five volt switching circuit 13. In such case, the diodes 373 to 375 are not necessary.

The five volt switching circuit 13 is connected to the main power supply switching circuit 21 via the LAN five volt power-on second data wiring 54 and the USB five volt power-on second data wiring 55. The five volt switching circuit 13 makes a determination as to whether the electric power source should be the LAN cable 6 or the USB cable 7 according to two signals: the LAN power-on signal supplied from the LAN incoming electricity detection circuit 10 indicating whether the LAN power source is turned on; and the USB power-ok signal supplied from the USB incoming electricity detection circuit 312 indicating whether the USB power source is ok. The five volt switching circuit 13 switches the output of the electric power so that the electric power is supplied to the DC/DC power supply unit 14 from the electric power source determined by the five volt switching circuit 13. In a case where the electric power source is switched to the supply from the LAN cable 6, the five volt switching circuit 13 outputs a LAN five volt power-on second signal to the main power supply switching circuit 21 to indicate that the electric power is supplied from the LAN cable 6. In a case where the electric power source is switched to the supply from the USB cable 7, the five volt switching circuit 13 outputs a USB five volt power-on second signal to the main power supply switching circuit 21 to indicate that the electric power is supplied from the USB cable 7.

Figure 16:
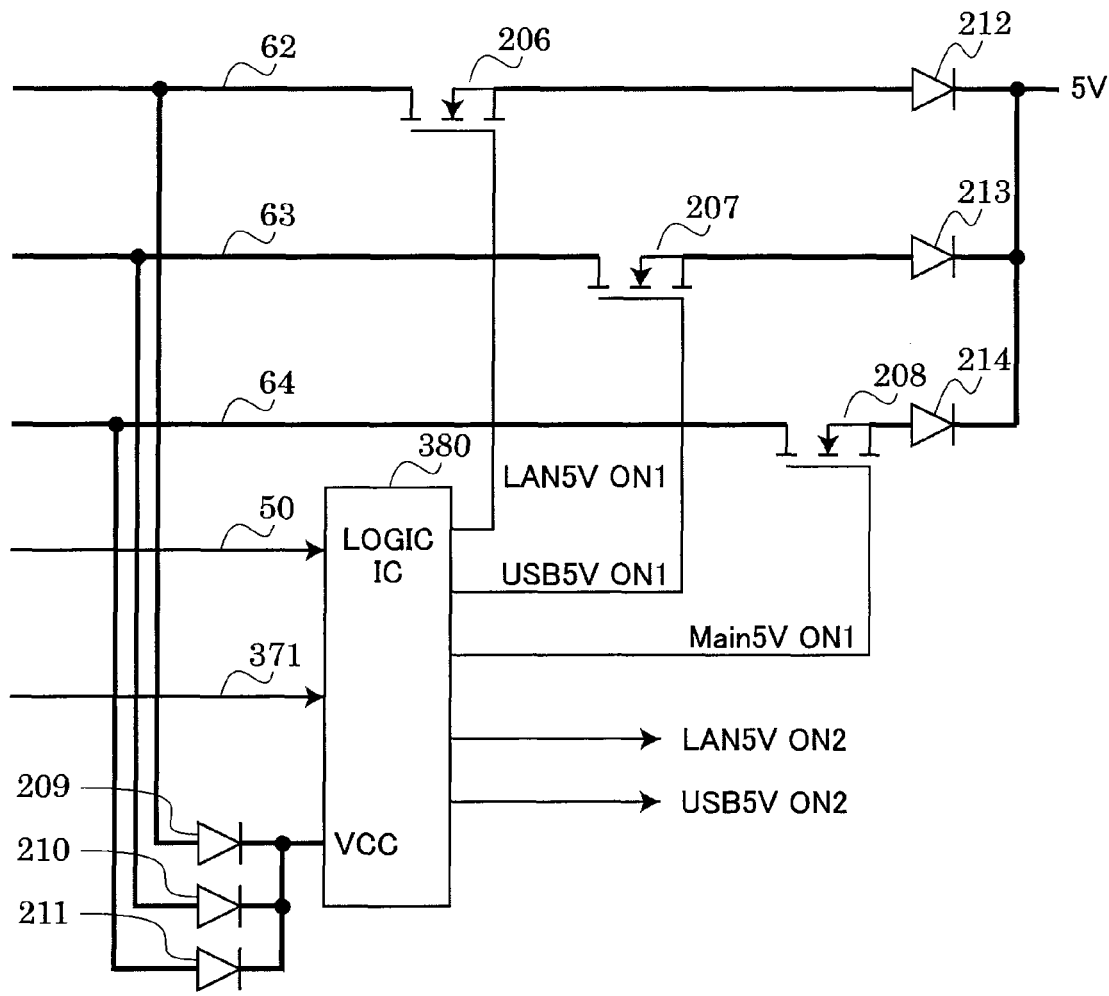
FIG. 16 is a figure describing the circuit configuration of a five volt switching circuit according to the second embodiment.

FIG. 16 is a figure describing the circuit configuration of the five volt switching circuit 13 according to this embodiment. The circuit configuration of the five volt switching circuit 13 according to the second embodiment is substantially the same as that of the five volt switching circuit 13 according to the first embodiment except that the USB power-ok signal is inputted from the USB incoming electricity detection circuit 312. The operation of the logic IC is slightly different due to the difference of the input signal, and accordingly, the logic IC in this embodiment is named as a logic IC 380.

FIG. 17 is a figure describing a switching logic of the logic IC 380 constituting the five volt switching circuit 13 according to this embodiment. The logic IC 380 has substantially the same switching logic as the logic IC 205 constituting the five volt switching circuit 13 according to the first embodiment as described in FIG. 6 except that the USB power-ok signal is inputted to the USB incoming electricity detection circuit 312.

The peripheral controller 319 is connected to the AC/DC power supply unit 4 via the print power-on data wiring 57 and the print power status data wiring 58. The peripheral controller 19 is connected to the print unit 3 via predetermined data wirings 60 and 61. The peripheral controller 319 is connected to the USB incoming electricity detection circuit 312 via the USB 500 mA-ok data wiring 370. According to instructions from the CPU 15, the peripheral controller 319 controls and monitors power supplying operation of the AC/DC power supply unit 4, and supplies a print instruction to the print unit 3. In a case where the CPU 15 determines that the USB controller 18 supplied with the electric power from the USB power supply OFF/ON circuit 20 can operate with the electric power supplied via the USB cable 7 from the host, the hub, and the like, the CPU 15 gives an instruction to the peripheral controller 319 to output the USB 500 mA-ok signal to the USB incoming electricity detection circuit 312. Upon receiving the instruction from the CPU 15, the peripheral controller 19 outputs the USB 500 mA-ok signal to the USB incoming electricity detection circuit 312.

Figure 18:
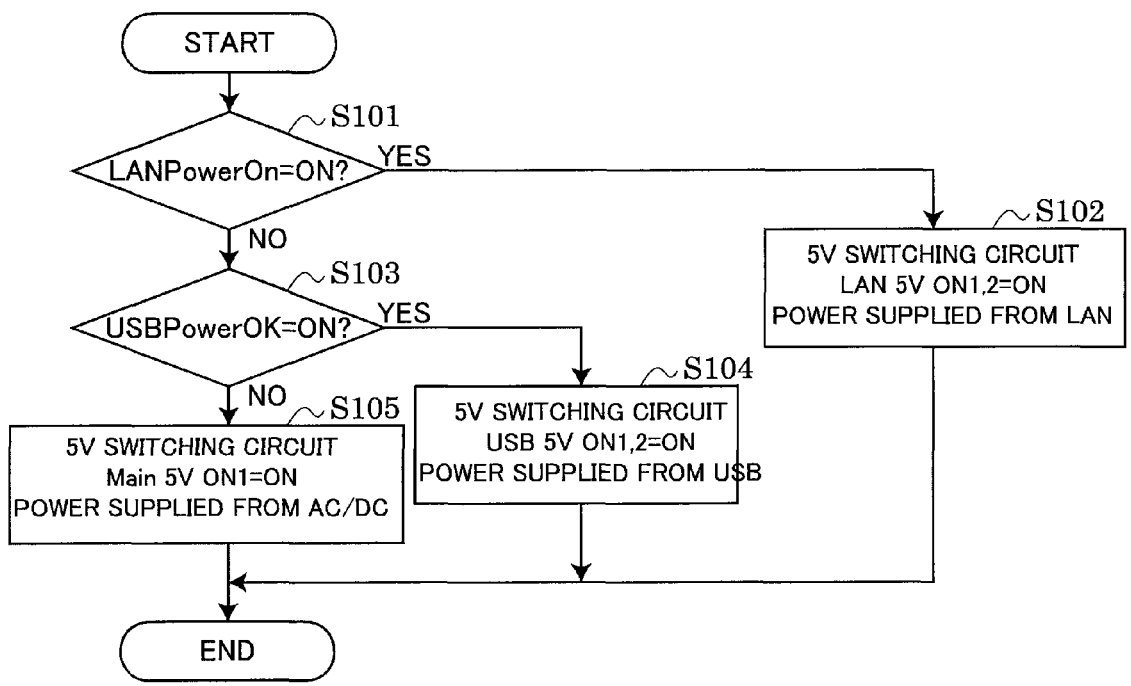
FIG. 18 is a flowchart describing the operation of the five volt switching circuit.

FIG. 18 is a flowchart describing the operation of the five volt switching circuit 13. First, the logic IC 380 in the five volt switching circuit 13 makes a determination as to whether the logic IC 380 has received from the LAN incoming electricity detection circuit 10 the LAN power-on signal indicating that the electric power supplied from the LAN five volt wiring 62 is within the operable range of the DC/DC power supply unit 14 (S11). At S101, in a case where the logic IC 380 determines that the LAN power-on signal is inputted, namely, where LAN Power On=ON (S101, YES), the logic IC 380 outputs the LAN five volt power-on first signal and the LAN five volt power-on second signal to indicate that the output voltage of the electric power from the LAN five volt wiring 62 has reached 5 volt. Thereby, the FET 206 as shown in FIG. 5 is turned on, and the electric power from the LAN five volt wiring 62 is outputted from the five volt switching circuit 13 (S102). In a case where the logic IC 380 determines that the LAN power-on signal is not inputted, namely, where LAN Power On=OFF (S101, NO), the logic IC 380 makes a determination as to whether the logic IC 380 has received from the USB incoming electricity detection circuit 312 the USB power-ok signal indicating that the electric power supplied from the USB five volt wiring 63 is within the operable range of the DC/DC power supply unit 14 (USB power-on signal) and indicating that the electric power supplied from the USB five volt wiring 63 can provide the electric power at the current of 500 mA (USB 500 mA-ok) (S103). The reason why the logic IC 380 confirms not only the USB cable 7 can provide the electric power at the current of 500 mA but also the USB cable 7 can provide the electric power within the operable range of the DC/DC power supply unit 14 is that whether the current of 500 mA can be supplied is not confirmed by a hardware method but is confirmed through a software method. Specifically, the USB controller 18 communicates with the host, the USB hub, and the like to confirm whether the current of 500 mA can be supplied. It is necessary to appropriately switch the electric power source without relying on the confirmation performed by software in a case where the host, the hub, and the like suddenly stops supplying the electric power. At S103, in a case where the logic IC 380 determines that the USB power-ok signal is inputted, namely, where USB Power OK=ON (S103, YES), the logic IC 380 outputs the USB five volt power-on first signal and USB five volt power-on second signal to indicate that the output voltage of the electric power from the USB five volt wiring 63 has reached 5 volt. Thereby, the FET 207 as shown in FIG. 15 is turned on, and the electric power from the USB five volt wiring 63 is outputted from the five volt switching circuit 13 (S104). At S103, in a case where the logic IC 380 determines that the USB power-ok signal is not inputted, namely, where USB Power OK=OFF (S103, NO), the logic IC 380 outputs the main five volt power-on first signal. Thereby, the FET 208 shown in FIG. 15 is turned on, and the electric power from the main five volt wiring 64 is outputted from the five volt switching circuit 13 (S105).

Figure 19:
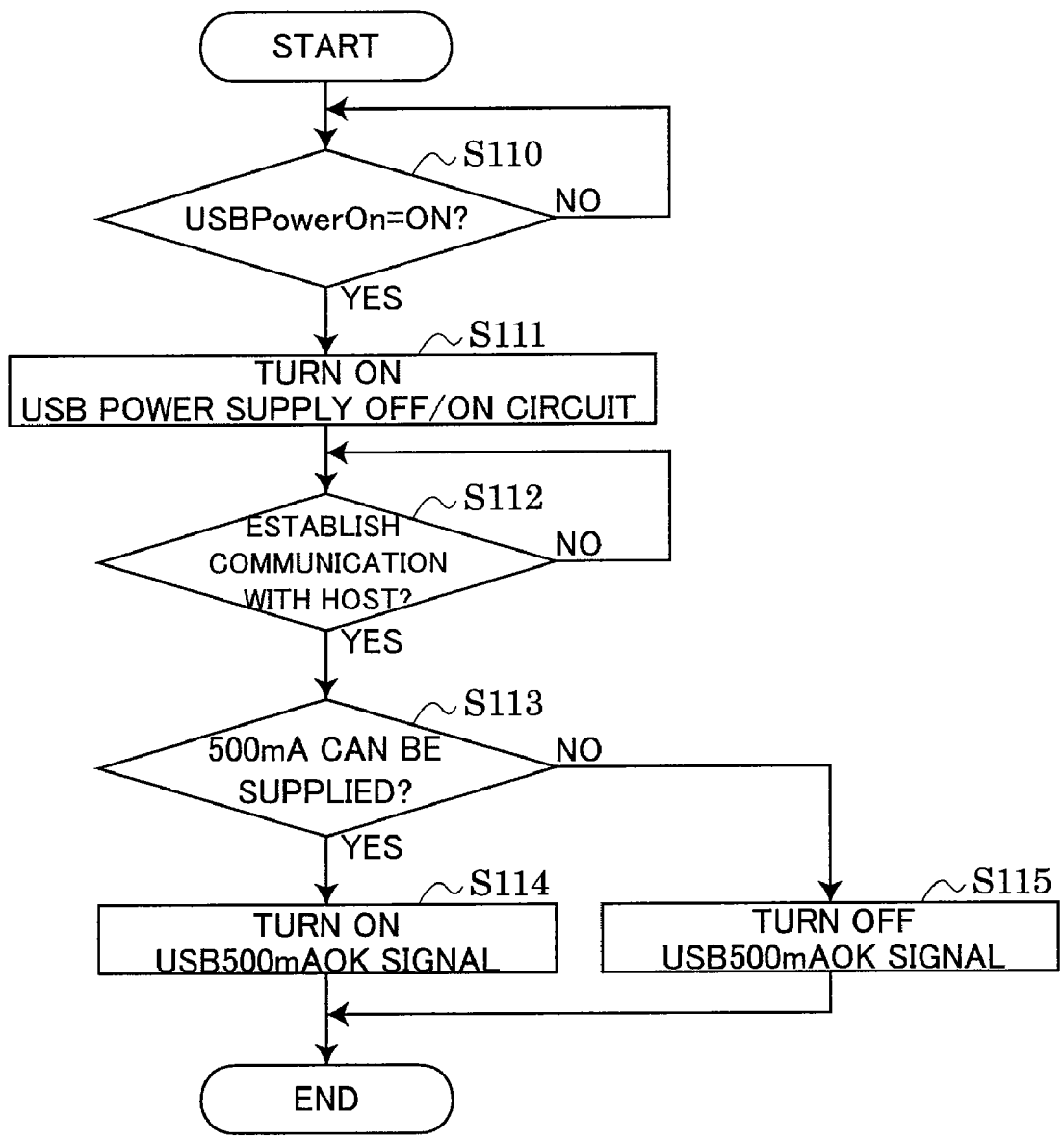
FIG. 19 is a figure describing the control of the USB 500 mA-ok signal of a peripheral controller.

FIG. 19 is a flowchart describing the control of the USB 500 mA-ok signal performed by the peripheral controller 319. The USB power supply OFF/ON circuit 20 makes a determination as to whether the USB incoming electricity detection circuit 312 outputs the USB power-on signal (S110). At S110, in a case where the USB power supply OFF/ON circuit 20 determines that the USB power-on signal is outputted (S110, YES), the USB power supply OFF/ON circuit 20 begins to supply the electric power to the USB controller 18 (S111). When the electric power begins to be supplied to the USB controller 18, the CPU 15 makes a determination as to whether a communication is established between the USB controller 18 and the host, the hub, and the like (S112). Subsequently, at S113, the CPU 15 makes a determination as to whether the electric power at the current of 500 mA can be supplied based on the communication between the USB controller 18 and the host, the hub, and the like. In a case where the electric power at the current of 500 mA can be supplied (S113, YES), the CPU 15 gives an instruction to the peripheral controller 319 to output the USB 500 mA-ok signal (S114). In a case where the electric power at the current of 500 mA cannot be supplied (S113, NO), the CPU 15 gives an instruction to the peripheral controller 319 to stop the USB 500 mA-ok signal. It should be noted that the USB 500 mA-ok signal is usually not outputted and is outputted only where it is confirmed that the USB cable 7 can supply the electric power.

Figure 20:
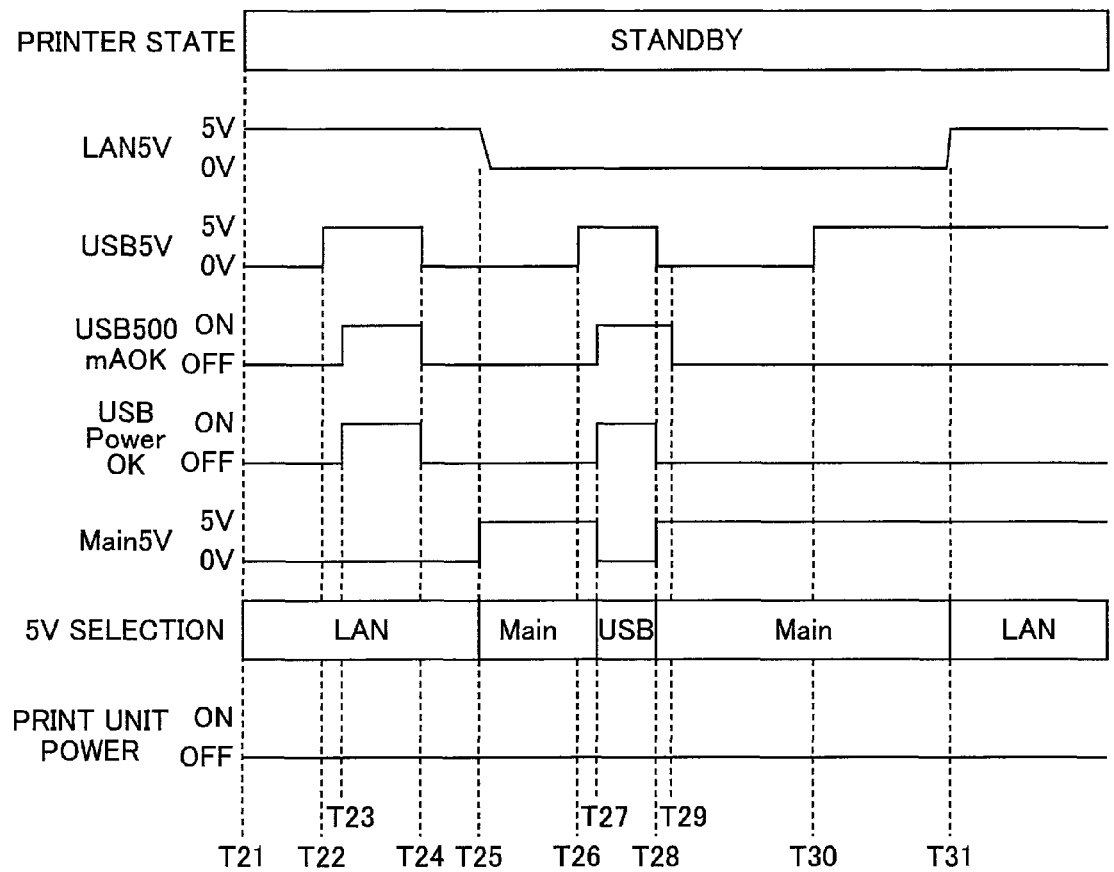
FIG. 20 is a figure describing an example of operation of the printer 301.

FIG. 20 is a time chart describing an example of operation of the printer 301. The time chart in FIG. 20 describes the example of operation while the printer 301 is waiting. First, the electric power (voltage 5 volt) is supplied to the printer 301 via the LAN cable 6 (T21). When the USB cable 7 is connected to the printer 301, the USB cable 7 begins to supply the electric power. But at this moment, it has not yet been confirmed that the electric power at the current of 500 mA can be supplied, and the USB 500 mA-ok signal and the USB power-ok signal have not yet been outputted (T22). When the USB controller 18 establishes the communication with the host, the hub, and the like, and confirms that the electric power at the current of 500 mA can be supplied, the peripheral controller 319 outputs the USB 500 mA-ok signal, and the USB incoming electricity detection circuit 312 outputs the USB power-ok signal. But, the electric power source is not changed because the supply of the electric power from the LAN cable 6 has higher priority than the supply of the electric power from the USB cable 7 (T23). Then, the electric power from the USB cable 7 stops due to a reason such as disconnection of the USB cable 7 from the printer 301, bad electrical contact, and the like. However, the electric power source is not changed because the supply of the electric power from the LAN cable 6 continues (T24). At T25, the supply of the electric power from the LAN cable 6 stops due to a reason such as disconnection of the LAN cable 6, bad electrical contact, and the like. In response, the five volt switching circuit 13 changes the electric power source to the AC/DC power supply unit 4. Subsequently, at T26, the USB cable 7 resumes to supply the electric power, and the electric power source is switched from the AC/DC power supply unit 4 to the USB cable 7. At this moment, the supply of the electric power at the current of 500 mA has not yet been confirmed, and the USB 500 mA-ok signal and the USB power-ok signal have not yet been outputted. When the USB controller 18 establishes a communication with the host, the hub, and the like, and confirms that the electric power at the current of 500 mA can be supplied, the peripheral controller 319 outputs the USB 500 mA-ok signal, and the USB incoming electricity detection circuit 312 outputs the USB power-ok signal (T27). Then, the USB cable 7 is disconnected from the printer 301, and the supply of the electric power from the USB cable 7 stops. Although the peripheral controller 319 has not yet finished a processing for stopping the USB 500 mA-ok signal, the USB incoming electricity detection circuit 312 immediately stops the USB power-ok signal because the USB incoming electricity detection circuit 312 monitors the electric power supplied from the USB cable 7 without relying on software communication. Because the USB incoming electricity detection circuit 312 stops the USB power-ok signal, the five volt switching circuit 13 switches the electric power source to the AC/DC power supply unit 4 (T28). The CPU detects that the communication is disconnected from the host, the hub, and the like, the CPU 15 gives an instruction to the peripheral controller 319 to stop the USB 500 mA-ok signal. Upon receiving the instruction, the peripheral controller 319 stops the output of the USB 500 mA-ok signal to the USB incoming electricity detection circuit 312. At this moment, the electric power source is not changed because the electric power source has already been switched to the AC/DC power supply unit 4 (T29). When the USB cable 7 resumes to supply the electric power, the USB controller 18 begins to communicate with the host, the hub, and the like. However, the peripheral controller 319 does not output the USB 500 mA-ok signal because it has not yet been confirmed that the electric power at the current of 500 mA can be supplied. The USB incoming electricity detection circuit 312 has not yet outputted the USB power-ok signal, either. Thus, the electric power source is still the AC/DC power supply unit 4 (T30). At T31, when the LAN cable 6 resumes the supply of the electric power, the five volt switching circuit 13 changes the electric power source from the AC/DC power supply unit 4 to the LAN cable 6. It should be noted that in the this embodiment, the supply of the electric power from the LAN cable 6 has higher priority than the supply of the electric power from the USB cable 7 because the maximum electric power that the LAN cable 6 can provide is 4.0 W according to the standard IEEE802.3af whereas the maximum electric power that the USB cable 7 can provide is only 2.5 W.

As hereinabove described, the printer 301 according to the second embodiment detects how much electric current can be drawn from one of the communication media. Thus, if the printer 1 needs an electric current in the standby state more than what the communication medium can provide, the printer 1 can switch the electric power to another of the communication media. Thus, the printer 301 can operate without drawing the electric current more than what the communication medium can provide.

Third Embodiment

Figure 21:
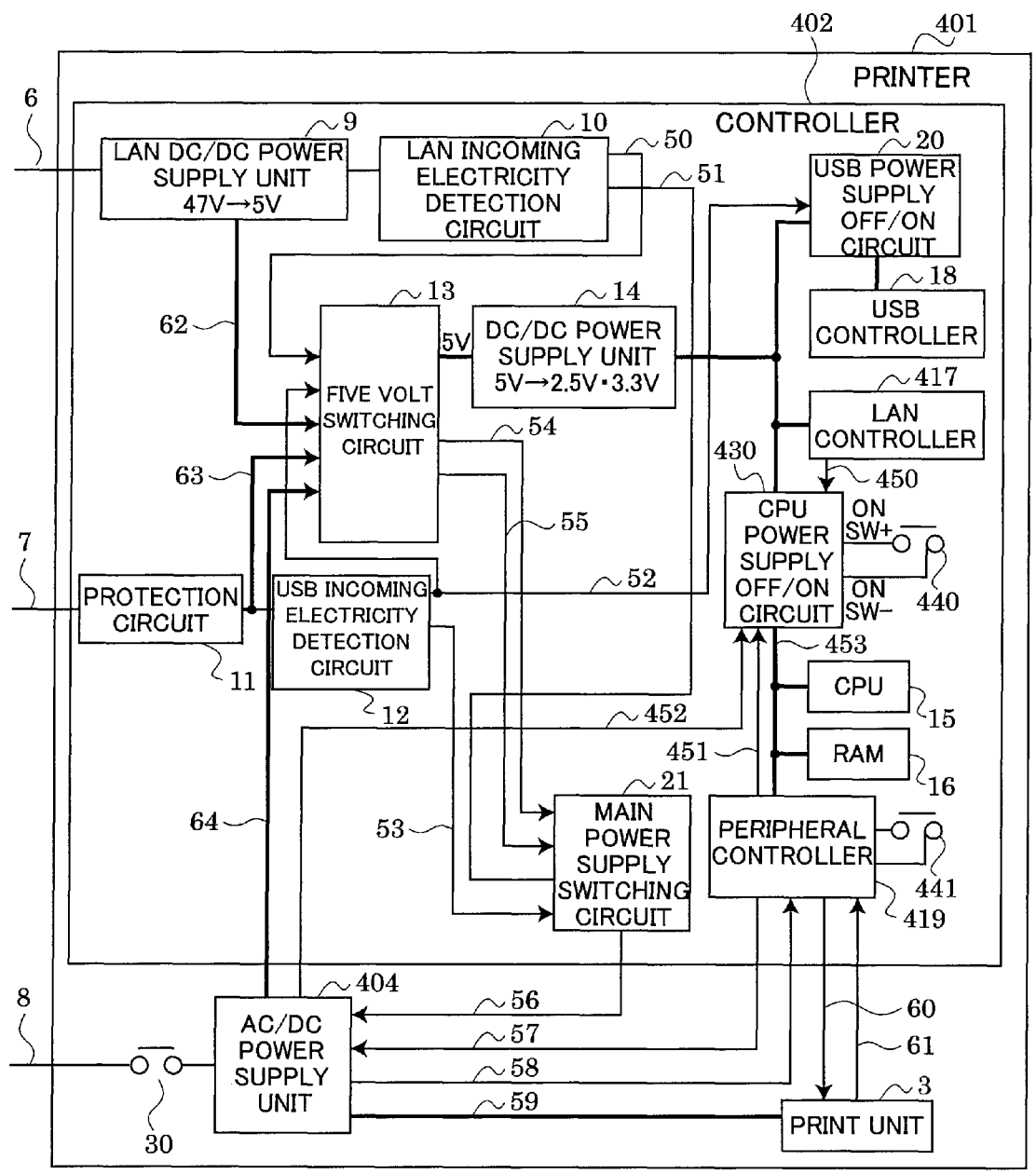
FIG. 21 is a figure describing an essential portion of a printer 401 according to the third embodiment.

FIG. 21 is a figure describing a printer 401 as an example of the information processing apparatus according to the third embodiment. In addition to the units of the printer 1 according to the first embodiment, the printer 401 according to the third embodiment has a CPU power supply OFF/ON circuit 430, a power-on switch 440, and a power-off switch 441.

The printer 401 has a controller 402 in place of the controller 2, an AC/DC power supply unit 404 in place of the AC/DC power supply unit 4, a LAN controller 417 in place of the LAN controller 17, and a peripheral controller 419 in place of the peripheral controller 19.

The LAN controller 417 is connected to the CPU power supply OFF/ON circuit 430 via a LAN wake-up data wiring 450. The LAN controller 417 analyzes a message received via the LAN cable 6, and if the LAN controller 417 receives a special message, the LAN controller 417 outputs the LAN wake-up signal to instruct the CPU power supply OFF/ON circuit 430 to start supplying the electric power to the CPU 15. In a case where the CPU power supply OFF/ON circuit 430 is to be turned on, the LAN controller 417 outputs a LAN wake-up signal to the CPU power supply OFF/ON circuit 430 for a certain period of time.

The CPU power supply OFF/ON circuit 430 is connected to the CPU 15, the RAM 16, and the peripheral controller 419 via a CPU power wiring 453. The CPU power supply OFF/ON circuit 430 is connected to the peripheral controller 419 via a CPU turn-off data wiring 451. The CPU power supply OFF/ON circuit 430 is connected to the AC/DC power supply unit 404 via an AC turn-on status data wiring 452. The CPU power supply OFF/ON circuit 430 is connected to the power-on switch 440 via a predetermined wiring. When the LAN controller 417 inputs the LAN wake-up signal to the CPU power supply OFF/ON circuit 430, the CPU power supply OFF/ON circuit 430 starts to supply the electric power to the CPU 15, the RAM 16, and the peripheral controller 419. The CPU power supply OFF/ON circuit 430 also monitors the power-on switch. In a case where the CPU power supply OFF/ON circuit 430 detects that a user presses down the power-on switch, the CPU power supply OFF/ON circuit 430 begins to supply the electric power to the CPU 15, the RAM 16, and the peripheral controller 419. It should be noted that the electric power is supplied to the CPU 15, the RAM 16, and the peripheral controller 419 only where following three conditions are satisfied: the power supply switch 30 is pressed down; an alternating current is being supplied to the AC/DC power supply unit 404; and the AC turn-on status signal is outputted via the AC turn-on status data wiring 452.

Figure 22:
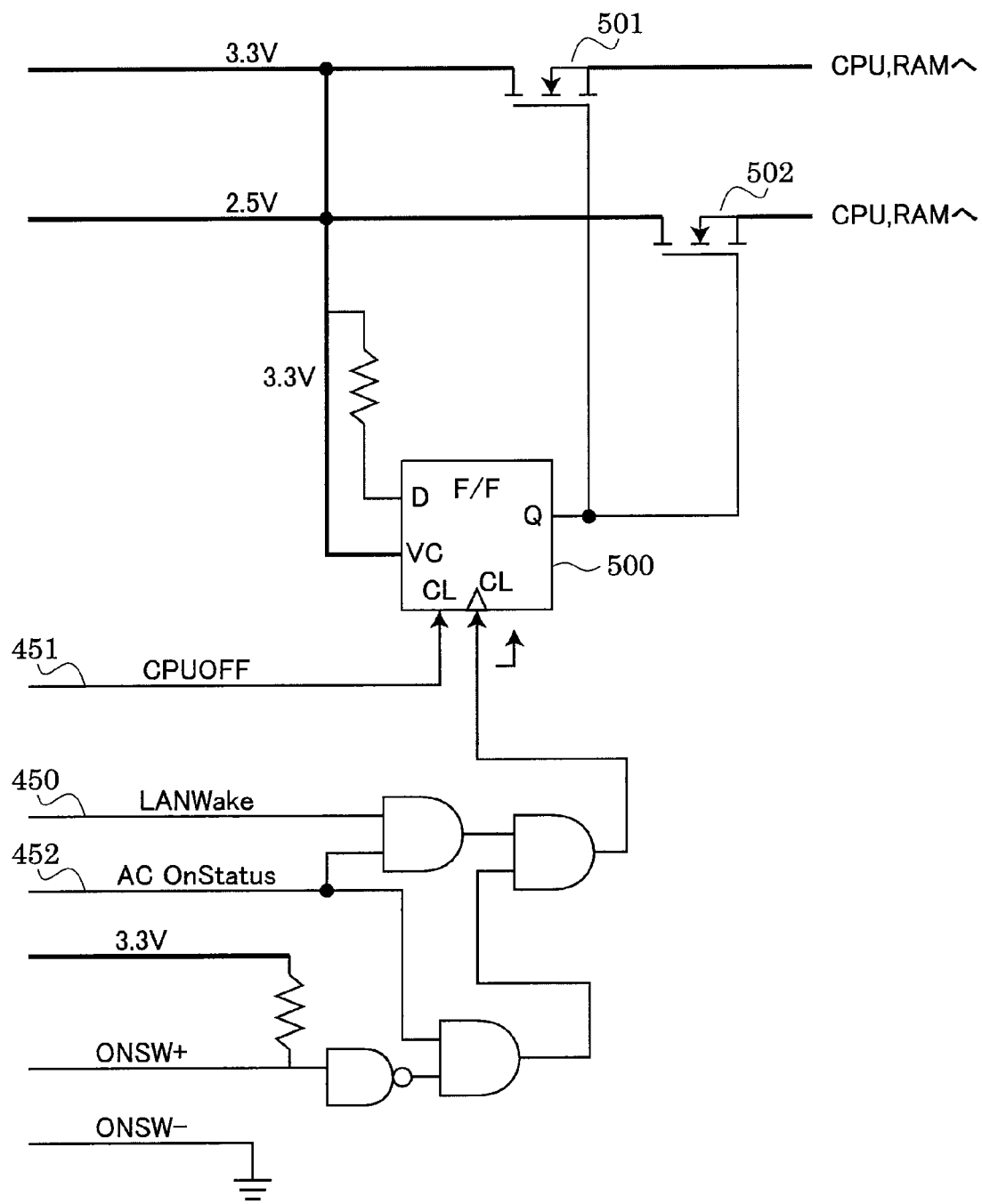
FIG. 22 is the circuit configuration of a CPU power supply OFF/ON circuit according to the third embodiment.

FIG. 22 is a figure describing the circuit configuration of the CPU power supply OFF/ON circuit 430. The CPU power supply OFF/ON circuit 430 starts and stops the supply of the electric power to the CPU 15 according to the LAN wake-up signal given by the LAN controller 17 to instruct to turn on, the power-on switch 44, and a CPU turn-off signal given by the peripheral controller 419. The CPU power supply OFF/ON circuit 430 has a flip-flop 500, an FETs 501 and 502, multiple AND circuits and NAND circuits for receiving the input of the LAN wake-up signal, the AC turn-on status signal, and the like. The flip-flop 500 is a latch for switching an FET start signal level inputted from an input terminal D to high level or low level according to an input signal.

The power-on switch 440 is connected to the CPU power supply OFF/ON circuit 430 via a predetermined wiring. In a case where a user pressed down the power-on switch 440 while an alternating current is supplied to the AC/DC power supply unit 404, the printer 401 goes into a standby state.

The power-off switch 441 is connected to the peripheral controller 419 via a predetermined wiring. When the printer 401 is to be turned off, the power-off switch 441 is pressed down. The peripheral controller 419 detects whether the power-off switch 441 is pressed down. In this embodiment, the peripheral controller 419 monitors whether the power-off switch 441 is pressed down, and notifies the CPU 15 to that effect. However, the printer 401 may be turned off via LAN and USB, or may be turned off using a timer, not shown.

The AC/DC power supply unit 404 is connected to the CPU power supply OFF/ON circuit 430 via the AC turn-on status data wiring 452. In a case where an external alternating current power supply is supplying an alternating current to the printer 401, the AC/DC power supply unit 404 outputs the AC turn-on status signal to the CPU power supply OFF/ON circuit 430. The AC/DC power supply unit 404 is connected to the print unit 3 via the print power wiring 59. The AC/DC power supply unit 4 supplies the electric power to the print unit 3 via the print power wiring 59.

The peripheral controller 419 is connected to the AC/DC power supply unit 404 via the print power-on data wiring 57 and the print power status data wiring 58. The peripheral controller 19 is connected to the print unit 3 via the predetermined data wirings 60 and 61. The peripheral controller 419 is connected to the CPU power supply OFF/ON circuit 430 via the CPU turn-off data wiring 451. The peripheral controller 419 is connected to the power-off switch 441 via a predetermined wiring. The peripheral controller 419 outputs the CPU turn-off signal to the CPU power supply OFF/ON circuit 430 based on an instruction from the CPU 15. The peripheral controller 419 notifies the CPU 15 of whether the power-off switch 441 is pressed down.

Next, the operation of the CPU power supply OFF/ON circuit 430 will be hereinafter described. The operation for starting to supply the electric power to the CPU 15, the RAM 16, and the peripheral controller 419 will be hereinafter described. In a case where the LAN wake-up signal is inputted from the LAN controller 417 or the power-on switch 440 is pressed down while the AC/DC power supply unit 404 is outputting the AC turn-on status signal to the CPU power supply OFF/ON circuit 430, the flip-flop 500 outputs the FET start signal inputted from the input terminal D to an output terminal Q as high level. The signal outputted from the flip-flop 500 turns on the FETs 501 and 502, and the electric power is supplied to the CPU 15, the RAM 16, and the peripheral controller 419. On the other hand, in a case where the supply of the electric power to the CPU 15, the RAM 16, and the peripheral controller 419 is to be stopped, the peripheral controller 419 inputs the CPU turn-off signal to the flip-flop 500, and the high level of the FET start signal held in the flip-flop 500 is cleared, and the output from the output terminal Q becomes low level. Thus, the FETs 501 and 502 are turned off, the supply of the electric power to the CPU 15, the RAM 16, and the peripheral controller 419 is stopped.

FIG. 23 is a flowchart describing the steps from when the printer 401 receives a power turn-on message instructing the printer 401 to turn on the power to when the printer 401 turns on the power. The LAN controller 417 makes a determination as to whether the LAN controller 417 has received the power turn-on message via the LAN cable 6 (S200). In a case where the LAN controller 417 receives the power turn-on message (S200, YES), the LAN controller 417 makes a determination as to whether the AC turn-on status signal is outputted to the CPU power supply OFF/ON circuit 430 to indicate that the alternating current is supplied to the AC/DC power supply unit 404, namely, as to where AC On Status=ON (S201, YES). The LAN controller 417 outputs the LAN wake-up signal to the CPU power supply OFF/ON circuit 430 for a certain period of time (S202). When the LAN controller 417 inputs the LAN wake-up signal to the CPU power supply OFF/ON circuit 430, the CPU power supply OFF/ON circuit 430 supplies the electric power to the CPU 15, the RAM 16, and the peripheral controller 419, which go into the standby state (S203). Thereafter, when the print instruction from the host machine is received, the CPU 15 executes the print processing.

FIG. 24 is a flowchart describing a processing to turn on the printer 401 by pressing down the power-on switch 440. The CPU power supply OFF/ON circuit 430 makes a determination as to whether the power-on switch 440 is pressed down S210). At S210, in a case where the CPU power supply OFF/ON circuit 430 determines that the power-on switch 440 is pressed down (S210, YES), the CPU power supply OFF/ON circuit 430 makes a determination as to whether the AC/DC power supply unit 430 is outputting the AC turn-on status signal to the CPU power supply OFF/ON circuit 430, namely, where AC On Status=ON (S211). In a case where AC On Status=ON (S211, YES), the CPU power supply OFF/ON circuit 430 supplies the electric power to the CPU 15, the RAM 16, and the peripheral controller 419, which go into the standby state. Thereafter, when the print instruction is received from the host machine, the CPU 15 performs the print processing.

FIG. 25 is a flowchart describing a processing to turn off the power of the printer 401. The peripheral controller 419 makes a determination as to whether the CPU 15 gives an instruction to turn off the power (S220). At S220, in a case where the CPU 15 gives the instruction to turn off the power (S220, YES), the peripheral controller 419 makes a determination as to whether the AC/DC power supply unit 404 is in a power-off state (S221). At S221, in a case where the AC/DC power supply unit 404 is in the power-off state (S221, YES), the peripheral controller 419 outputs the CPU turn-off signal to the CPU power supply OFF/ON circuit 430 (S222). The printer 401 is turned off (S223). At S221, in a case where the AC/DC power supply unit 404 is not in the power-off state (S221, NO), the peripheral controller 419 or the CPU 15 makes a determination as to whether the print unit 3 can be stopped (S224). At S224, in a case where it is determined that the print unit 3 can be stopped, the peripheral controller 419 stops the AC/DC power supply unit 404.

FIG. 26 is a time chart describing an example of operation of the printer 401. While the printer 401 is turned off, the electric power (5 volt) from the LAN cable 6 and the electric power (5 volt) form the USB cable 7 are supplied to the printer 401. Actually, the electric power from the LAN cable 6 is supplied to the printer 401 (T40). Then, the supply of the electric power to the printer 401 stops due to a reason such as disconnection of the LAN cable 6 from the printer 401, bad electrical contact, and the like. Then, the five volt switching circuit 13 switches the supply of the electric power to the USB cable 7 (T41). At T42, the supply of the electric power from the LAN cable 6 resumes. Then, the five volt switching circuit 13 switches the electric power source from the USB cable 7 to the LAN cable 6. The supply of the electric power from the USB cable 7 stops due to a reason such as disconnection of the USB cable 7 from the printer 401, bad electrical contact, and the like, but the electric power source is not changed because the electric power from the LAN cable 6 continues (T43). Subsequently, at T44, the supply of the electric power from the USB cable 7 resumes, but the electric power source is not changed because the supply of the electric power from the LAN cable 6 has higher priority than the supply of the electric power from the USB cable 7. When the LAN controller 417 receives the power turn-on message from the LAN cable 6, the LAN controller 41 outputs the LAN wake-up signal to the CPU power supply OFF/ON circuit 430. Upon receiving the LAN wake-up signal, the CPU power supply OFF/ON circuit 430 supplies the electric power to the CPU 15, the RAM 16, and the peripheral controller 419 via the CPU power wiring 453. The printer 401 goes into the standby state (T45). When the CPU 15 receives the print instruction from the host machine via the LAN cable 6 or the USB cable 7, the CPU 15 gives an instruction to the peripheral controller 419 to output the print power-on signal to the AC/DC power supply unit 404. Upon receiving the print power-on signal, the AC/DC power supply unit 403 starts to supply the electric power to the print unit 3, and the print unit 3 starts printing (T46). When the print unit 3 finishes printing, the print unit 3 stops, and the printer 401 goes into the standby state (T47). The peripheral controller 419 detects that the power-off switch 441 is pressed down, and notifies the CPU 15 to that effect. The CPU 15 gives an instruction to the peripheral controller 419 to stop the CPU 15. Upon receiving the instruction, the peripheral controller 419 outputs the CPU turn-off signal to the CPU power supply OFF/ON circuit 430. Upon receiving the CPU turn-off signal, the CPU power supply OFF/ON circuit 430 stops supplying to the electric power to the CPU 15, the RAM 16, and the peripheral controller 419.

As hereinabove described, the printer 401 according to the third embodiment can be powered on remotely via the LAN. Even when the printer 401 is powered off, the printer 401 switches the source of the electric power if the supply of the electric power from one of the communication media becomes unstable. Thus, the printer 401 can be reliably powered on remotely via the LAN.

In the embodiments, a printer is described as an example of the information processing apparatus. But this invention is not limited thereto. This invention can be applied to apparatuses receiving electric powers from multiple interfaces and has its own power supply. For example, this invention can be applied to a personal computer, a scanner, a facsimile machine, a copier, a television set, a set top box, a printer server, and the like.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention should not be limited by the specification, but be defined by the claims set forth below.

What is claimed is:

1. An information processing apparatus, comprising:
   a processor for performing an information processing;
   a power supply unit for receiving an external electric power from an external electric power source;
   a first power receiving unit connectable to a first communication medium connected to and in communication with a first host machine to receive a first electric power from the first communication medium;
   a second power receiving unit connectable to a second communication medium connected to and in communication with a second host machine to receive a second electric power from the second communication medium;
   an electric power detection unit for detecting the first electric power and the second electric power;
   a controller for detecting a maximum current allowed to be drawn from the second communication medium,
   a switching unit connected to the power supply unit, the first power receiving unit, and the second power receiving unit to receive the external electric power, the first electric power, and the second electric power, said switching unit receiving a result of detection from the electric power detection unit,
   wherein the switching unit supplies one of the external electric power, the first electric power, and the second electric power to the processor according to the result of detection made by the electric power detection unit and a result of detection made by the controller, and
   wherein even where the second power receiving unit can provide the second electric power, the second electric power is not supplied to the processor when the maximum current allowed to be drawn from the second communication medium is less than an electric current consumed by the processor.

2. The information processing apparatus according to claim 1, wherein the external electric power source is an AC (Alternating Current) wall outlet.

3. The information processing apparatus according to claim 1, wherein the first communication medium is a LAN (Local Area Network).

4. The information processing apparatus according to claim 1, wherein the second communication medium is a USB (Universal Serial Bus).

5. The information processing apparatus according to claim 1, wherein the switching unit supplies one of the external electric power, the first electric power, and the second electric power capable of providing a highest amount of electric power to the processor, in a case where two or more of the external electric power, the first electric power, and the second electric power can provide the electric power.

6. An information processing apparatus having a print unit, the information processing apparatus comprising:
   a processor for performing an information processing;
   a power supply unit for receiving an external electric power from an external electric power source;
   a first power receiving unit connectable to a first communication medium connected to and in communication with a first host machine to receive a first electric power from the first communication medium;
   a second power receiving unit connectable to a second communication medium connected to and in communication with a second host machine to receive a second electric power from the second communication medium;
   an electric power detection unit for detecting the first electric power and the second electric power; and
   a switching unit connected to the power supply unit, the first power receiving unit, and the second power receiving unit to receive the external electric power, the first electric power, and the second electric power, said switching unit receiving a result of detection from the electric power detection unit and supplying one of the external electric power, the first electric power, and the second electric power to the processor according to the result of detection supplied from the electric power detection unit,
   wherein even where one of the first electric power and the second electric power is available, the switching unit is configured to supply the external electric power is supplied to the print unit when the print unit performs a print processing.

7. The information processing apparatus according to claim 6 further comprising a wake-up controller for receiving a special message from the first communication medium,
wherein the wake-up controller turns on the print unit when the wake-up controller receives the special message.

8. An information processing apparatus having a print unit comprising:
a processor for performing an information processing;
a power supply unit for receiving an external electric power from an external electric power source;
a first power receiving unit connectable to a first communication medium connected to and in communication with a host machine to receive a first electric power from the first communication medium;
a second power receiving unit connectable to a second communication medium connected to and in communication with the host machine to receive a second electric power from the second communication medium;
an electric power detection unit for detecting the first electric power and the second electric power; and
a switching unit connected to the power supply unit, the first power receiving unit, and the second power receiving unit to receive the external electric power, the first electric power, and the second electric power, for receiving a result of detection from the electric power detection unit and supplying one of the external electric power, the first electric power, and the second electric power to the processor according to the result of detection supplied from the electric power detection unit,
wherein, in a case where both of the first electric power supplied from the first communication medium and the second electric power supplied from the second communication medium are within the operable range of the processor, the switching unit preferentially selects the first communication medium over the second communication medium to supply the electric power to the processor, and
wherein even where one of the first electric power and the second electric power is available, the switching unit is configured to switch to the external electric power to the print unit when the print unit performs a print processing.

9. The information processing apparatus according to claim 8, wherein the maximum of the first electric power is larger than the maximum of the second electric power.

* * * * *